(12) United States Patent
Zhong et al.

(10) Patent No.: US 12,133,199 B2
(45) Date of Patent: Oct. 29, 2024

(54) METHOD AND APPARATUS FOR TRANSMITTING SERVICE DATA

(71) Applicant: HUAWEI TECHNOLOGIES CO., LTD., Guangdong (CN)

(72) Inventors: Qiwen Zhong, Shenzhen (CN); Zhigang Zhu, Shenzhen (CN); Chunsheng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 17/669,423

(22) Filed: Feb. 11, 2022

(65) Prior Publication Data

US 2022/0167316 A1    May 26, 2022

Related U.S. Application Data

(63) Continuation of application No. PCT/CN2020/108047, filed on Aug. 10, 2020.

(30) Foreign Application Priority Data

Aug. 13, 2019   (CN) .......................... 201910745224.8

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0044* (2013.01); *H04W 28/26* (2013.01); *H04W 72/0446* (2013.01)

(58) Field of Classification Search
CPC ....... H04L 12/413; H04L 12/40; H04L 25/14; H04L 69/28; H04L 69/08; H04L 25/49; H04L 49/351; H04L 49/20; H04J 3/167; H04J 3/1658; H04J 3/1611; H04J 2203/0085; H04J 2203/0003;
(Continued)

(56) References Cited

U.S. PATENT DOCUMENTS

2017/0005742 A1 * 1/2017 Gareau ................. H04J 3/1658
2017/0005949 A1 * 1/2017 Gareau ................. H04L 12/413
(Continued)

FOREIGN PATENT DOCUMENTS

CN          101114872 A      1/2008
CN          102056312 A      5/2011
(Continued)

OTHER PUBLICATIONS

Office Action issued in CN201910745224.8, dated Aug. 26, 2023, 8 pages.
(Continued)

*Primary Examiner* — Jung Liu

(57) ABSTRACT

A method and an apparatus for transmitting service data are disclosed. In technical solutions of the present disclosure, when an exclusive service does not completely occupy a bandwidth resource allocated to the exclusive service, data transmission of at least two candidate services on an actually unused bandwidth is supported. In this way, a waste of bandwidth resources can be reduced and network utilization can be improved.

11 Claims, 37 Drawing Sheets

(51) Int. Cl.
*H04W 28/26* (2009.01)
*H04W 72/0446* (2023.01)

(58) Field of Classification Search
CPC ............ H04J 2203/0089; H04Q 11/04; H04Q 2213/13389
See application file for complete search history.

(56) References Cited

U.S. PATENT DOCUMENTS

| 2018/0167160 A1* | 6/2018 | Gareau | H04L 41/00 |
| 2018/0375800 A1* | 12/2018 | Gareau | H04L 49/35 |
| 2021/0083940 A1* | 3/2021 | Peng | H04L 47/803 |

FOREIGN PATENT DOCUMENTS

| CN | 105871502 A | 8/2016 |
| CN | 106411454 A | 2/2017 |
| CN | 106788855 A | 5/2017 |
| CN | 107566075 A | 1/2018 |
| CN | 107786320 A | 3/2018 |
| CN | 109951896 A | 6/2019 |
| CN | 109962762 A | 7/2019 |
| CN | 109951896 B | 1/2021 |
| WO | 2018000894 A1 | 1/2018 |
| WO | 2018036485 A1 | 3/2018 |
| WO | 2019128462 A1 | 7/2019 |
| WO | 2019128664 A1 | 7/2019 |

OTHER PUBLICATIONS

HTC, ITRI et al., "Reusing PUCCH format 3 to multiplex CSI reports for DL COMP", 3GPP TSG-RAN WG1 #70bis, San Diego, USA, Oct. 8-12, 2012, R1-124350, total: 5 pages.
International Search Report and Written Opinion issued in PCT/CN2020/108047, dated Nov. 3, 2020, 8 pages.
Extended European Search Report issued in EP20851784.7, dated Oct. 5, 2022, 6 pages.

* cited by examiner

FIG. 4

| 1 | 2 | 3 | 4 | 5 | 6 | 7 | 8 | 9 | 10 | 11 | 12 | 13 | 14 | 15 | 16 | 17 | 18 | 19 | 20 | Map |
|---|---|---|---|---|---|---|---|---|---|---|---|---|---|---|---|---|---|---|---|---|
| /I/ | D/C | D/C | D/C | D/C | D/C | D/C | D/C | D/C | /I/ | D/C | /I/ | D/C | D/C | D/C | D/C | /I/ | D/C | D/C | D/C | 0111,1111,1010,1111,0111 |
| D/C | D/C | D/C | D/C | D/C | D/C | D/C | D/C | D/C | D/C | D/C | D/C | D/C | D/C | D/C | D/C | D/C | D/C | D/C | D/C | 1111,1111,1111,1111,1111 |
| D/C | D/C | /I/ | D/C | D/C | D/C | D/C | D/C | D/C | D/C | D/C | D/C | D/C | D/C | D/C | D/C | D/C | D/C | D/C | D/C | 1101,1111,1111,1111,1111 |
| D/C | D/C | /I/ | D/C | D/C | D/C | D/C | D/C | D/C | D/C | D/C | D/C | D/C | D/C | D/C | D/C | D/C | D/C | D/C | D/C | 1101,1111,1111,1111,1111 |
| D/C | D/C | /I/ | D/C | D/C | D/C | /I/ | D/C | D/C | D/C | /I/ | D/C | D/C | D/C | /I/ | D/C | D/C | D/C | D/C | D/C | 1101,1011,1101,1101,1111 |
| D/C | /I/ | /I/ | /I/ | D/C | /I/ | D/C | /I/ | /I/ | D/C | /I/ | D/C | /I/ | D/C | /I/ | D/C | /I/ | D/C | D/C | D/C | 1000,1101,0101,1010,0111 |
| D/C | /I/ | /I/ | /I/ | /I/ | D/C | /I/ | /I/ | /I/ | D/C | D/C | /I/ | /I/ | /I/ | D/C | D/C | D/C | D/C | D/C | /I/ | 1000,1100,0110,0011,1000 |
| D/C | D/C | D/C | D/C | D/C | D/C | D/C | D/C | D/C | D/C | D/C | D/C | D/C | D/C | D/C | D/C | D/C | D/C | D/C | D/C | 1111,1100,1111,1111,1111 |
| /I/ | /I/ | /I/ | D/C | D/C | D/C | D/C | D/C | D/C | D/C | D/C | D/C | D/C | D/C | D/C | D/C | D/C | D/C | D/C | D/C | 0001,1111,1111,1111,1111 |
|   |   |   |   |   |   |   |   |   |   |   |   |   |   |   |   |   |   |   |   |   |
| /I/ | /I/ | /I/ | /I/ | /I/ | /I/ | /I/ | /I/ | /I/ | /I/ | /I/ | /I/ | /I/ | /I/ | /I/ | /I/ | /I/ | /I/ | /I/ | /I/ | 0000,0000,0000,0000,0000 |

FIG. 5

| 1 | 2 | 3 | 4 | 5 | 6 | 7 | 8 | 9 | 10 | 11 | 12 | 13 | 14 | 15 | 16 | 17 | 18 | 19 | 20 | Hybrid multiplexing overhead block indication map |
|---|---|---|---|---|---|---|---|---|---|---|---|---|---|---|---|---|---|---|---|---|
| HOH | D/C | D/C | D/C | D/C | D/C | D/C | D/C | D/C | HOH | D/C | HOH | D/C | D/C | D/C | D/C | // | D/C | D/C | D/C | 1000,0000,0101,0000,0000 |
| D/C | D/C | // | D/C | D/C | D/C | D/C | D/C | D/C | D/C | D/C | D/C | D/C | D/C | D/C | D/C | D/C | D/C | D/C | D/C | 0000,0000,0000,0000,0000 |
| D/C | D/C | // | D/C | D/C | D/C | D/C | D/C | D/C | D/C | D/C | D/C | D/C | D/C | D/C | D/C | D/C | D/C | D/C | D/C | 0000,0000,0000,0000,0000 |
| D/C | D/C | D/C | D/C | D/C | D/C | D/C | D/C | D/C | D/C | D/C | D/C | D/C | D/C | D/C | D/C | D/C | D/C | D/C | D/C | 0000,0000,0000,0000,0000 |
| D/C | D/C | HOH | HOH | D/C | HOH | D/C | D/C | D/C | D/C | HOH | D/C | D/C | D/C | D/C | D/C | D/C | D/C | D/C | D/C | 0010,0100,0010,0000,0000 |
| D/C | HOH | HOH | HOH | D/C | D/C | // | D/C | // | D/C | // | D/C | D/C | D/C | // | D/C | // | D/C | // | D/C | 0111,0000,0000,0000,0000 |
| D/C | HOH | HOH | HOH | D/C | D/C | // | // | D/C | D/C | D/C | // | // | // | // | D/C | D/C | // | D/C | // | 0111,0000,0000,0000,0000 |
| D/C | D/C | D/C | D/C | D/C | D/C | // | D/C | D/C | D/C | D/C | D/C | D/C | D/C | D/C | D/C | D/C | D/C | D/C | D/C | 0000,0000,0000,0000,0000 |
| D/C | // | // | D/C | D/C | D/C | D/C | D/C | D/C | D/C | D/C | D/C | D/C | D/C | D/C | D/C | D/C | D/C | D/C | D/C | 0000,0000,0000,0000,0000 |
| // | // | // | // | // | // | // | // | // | // | // | // | // | // | // | // | // | // | // | // | |
| HOH | HOH | HOH | // | | | | | | | | | | | | | | | | | 1110,0000,0000,0000,0000 |

| | | CONT. FROM FIG. 10A | CONT. FROM FIG. 10A |
|---|---|---|---|
| 1 | 0 | Service carried in a calendar A in a slot 0 | Service carried in a calendar B in the slot 0 |
| 2 | 0 | Service carried in the calendar A in a slot 1 | Service carried in the calendar B in the slot 1 |
| 3 | 0 | Service carried in the calendar A in a slot 2 | Service carried in the calendar B in the slot 2 |
| 4 | 0 | Service carried in the calendar A in a slot 3 | Service carried in the calendar B in the slot 3 |
| 5 | 0 | Service carried in the calendar A in a slot 4 | Service carried in the calendar B in the slot 4 |
| 6 | 0 | Service carried in the calendar A in a slot 5 | Service carried in the calendar B in the slot 5 |
| 7 | 0 | Service carried in the calendar A in a slot 6 | Service carried in the calendar B in the slot 6 |
| 8 | 0 | Service carried in the calendar A in a slot 7 | Service carried in the calendar B in the slot 7 |
| 9 | 0 | Service carried in the calendar A in a slot 8 | Service carried in the calendar B in the slot 8 |
| 10 | 0 | Service carried in the calendar A in a slot 9 | Service carried in the calendar B in the slot 9 |
| 11 | 0 | Service carried in the calendar A in a slot 10 | Service carried in the calendar B in the slot 10 |
| 12 | 0 | Service carried in the calendar A in a slot 11 | Service carried in the calendar B in the slot 11 |
| 13 | 0 | Service carried in the calendar A in a slot 12 | Service carried in the calendar B in the slot 12 |
| 14 | 0 | Service carried in the calendar A in a slot 13 | Service carried in the calendar B in the slot 13 |
| 15 | 0 | Service carried in the calendar A in a slot 14 | Service carried in the calendar B in the slot 14 |
| 16 | 0 | Service carried in the calendar A in a slot 15 | Service carried in the calendar B in the slot 15 |
| 17 | 1 | Service carried in the calendar A in a slot 16 | Service carried in the calendar B in the slot 16 |
| 18 | 1 | Service carried in the calendar A in a slot 17 | Service carried in the calendar B in the slot 17 |
| 19 | 1 | Service carried in the calendar A in a slot 18 | Service carried in the calendar B in the slot 18 |
| 20 | 1 | Service carried in the calendar A in a slot 19 | Service carried in the calendar B in the slot 19 |
| 21 | 1 | Reserved | Reserved |
| 22 | 1 | Reserved | Reserved |
| 23 | 1 | Reserved | Reserved |
| 24 | 1 | Reserved | Reserved |
| 25 | 1 | Reserved | Reserved |
| 26 | 1 | Reserved | Reserved |
| 27 | 1 | Reserved | Reserved |
| 28 | 1 | Reserved | Reserved |
| 29 | 1 | Reserved | Reserved |
| 30 | 1 | Reserved | Reserved |
| 31 | 1 | Reserved | Reserved |
| 32 | 1 | Reserved | Reserved |

FIG. 10B

| | | |
|---|---|---|
| 1 | 0 | Service carried in a calendar A in a slot 0 | Service carried in a calendar B in the slot 0 |
| 2 | 0 | Service carried in the calendar A in a slot 1 | Service carried in the calendar B in the slot 1 |
| 3 | 0 | Service carried in the calendar A in a slot 2 | Service carried in the calendar B in the slot 2 |
| 4 | 0 | Service carried in the calendar A in a slot 3 | Service carried in the calendar B in the slot 3 |
| 5 | 0 | Service carried in the calendar A in a slot 4 | Service carried in the calendar B in the slot 4 |
| 6 | 0 | Service carried in the calendar A in a slot 5 | Service carried in the calendar B in the slot 5 |
| 7 | 0 | Service carried in the calendar A in a slot 6 | Service carried in the calendar B in the slot 6 |
| 8 | 0 | Service carried in the calendar A in a slot 7 | Service carried in the calendar B in the slot 7 |
| 9 | 0 | Service carried in the calendar A in a slot 8 | Service carried in the calendar B in the slot 8 |
| 10 | 0 | Service carried in the calendar A in a slot 9 | Service carried in the calendar B in the slot 9 |
| 11 | 0 | Service carried in the calendar A in a slot 10 | Service carried in the calendar B in the slot 10 |

| | | CONT. FROM FIG. 11A | |
|---|---|---|---|
| 12 | 0 | Service carried in the calendar A in a slot 11 | Service carried in the calendar B in the slot 11 |
| 13 | 0 | Service carried in the calendar A in a slot 12 | Service carried in the calendar B in the slot 12 |
| 14 | 0 | Service carried in the calendar A in a slot 13 | Service carried in the calendar B in the slot 13 |
| 15 | 0 | Service carried in the calendar A in a slot 14 | Service carried in the calendar B in the slot 14 |
| 16 | 0 | Service carried in the calendar A in a slot 15 | Service carried in the calendar B in the slot 15 |
| 17 | 1 | Service carried in the calendar A in a slot 16 | Service carried in the calendar B in the slot 16 |
| 18 | 1 | Service carried in the calendar A in a slot 17 | Service carried in the calendar B in the slot 17 |
| 19 | 1 | Service carried in the calendar A in a slot 18 | Service carried in the calendar B in the slot 18 |
| 20 | 1 | Service carried in the calendar A in a slot 19 | Service carried in the calendar B in the slot 19 |

CONT. FROM FIG. 11B

| | Candidate service 1 carried in the calendar A | Candidate service 2 carried in the calendar A | Candidate service 1 carried in the calendar B | Candidate service 2 carried in the calendar B |
|---|---|---|---|---|
| 21 | | | | |
| 22 | | | | |
| 23 | Service pointer corresponding to a multiplexing slot 0 in the calendar A | Service pointer corresponding to a multiplexing slot 1 in the calendar A | Service pointer corresponding to the multiplexing slot 0 in the calendar B | Service pointer corresponding to the multiplexing slot 1 in the calendar B |
| 24 | Service pointer corresponding to a multiplexing slot 2 in the calendar A | Service pointer corresponding to a multiplexing slot 3 in the calendar A | Service pointer corresponding to the multiplexing slot 2 in the calendar B | Service pointer corresponding to the multiplexing slot 3 in the calendar B |
| 25 | Service pointer corresponding to a multiplexing slot 4 in the calendar A | Service pointer corresponding to a multiplexing slot 5 in the calendar A | Service pointer corresponding to the multiplexing slot 4 in the calendar B | Service pointer corresponding to the multiplexing slot 5 in the calendar B |
| 26 | Service pointer corresponding to a multiplexing slot 6 in the calendar A | Service pointer corresponding to a multiplexing slot 7 in the calendar A | Service pointer corresponding to the multiplexing slot 6 in the calendar B | Service pointer corresponding to the multiplexing slot 7 in the calendar B |
| 27 | Service pointer corresponding to a multiplexing slot 8 in the calendar A | Service pointer corresponding to a multiplexing slot 9 in the calendar A | Service pointer corresponding to the multiplexing slot 8 in the calendar B | Service pointer corresponding to the multiplexing slot 9 in the calendar B |
| 28 | Service pointer corresponding to a multiplexing slot 10 in the calendar A | Service pointer corresponding to a multiplexing slot 11 in the calendar A | Service pointer corresponding to the multiplexing slot 10 in the calendar B | Service pointer corresponding to the multiplexing slot 11 in the calendar B |
| 29 | Service pointer corresponding to a multiplexing slot 12 in the calendar A | Service pointer corresponding to a multiplexing slot 13 in the calendar A | Service pointer corresponding to the multiplexing slot 12 in the calendar B | Service pointer corresponding to the multiplexing slot 13 in the calendar B |
| 30 | Service pointer corresponding to a multiplexing slot 14 in the calendar A | Service pointer corresponding to a multiplexing slot 15 in the calendar A | Service pointer corresponding to the multiplexing slot 14 in the calendar B | Service pointer corresponding to the multiplexing slot 15 in the calendar B |
| 31 | Service pointer corresponding to a multiplexing slot 16 in the calendar A | Service pointer corresponding to a multiplexing slot 17 in the calendar A | Service pointer corresponding to the multiplexing slot 16 in the calendar B | Service pointer corresponding to the multiplexing slot 17 in the calendar B |
| 32 | Service pointer corresponding to a multiplexing slot 18 in the calendar A | Service pointer corresponding to a multiplexing slot 19 in the calendar A | Service pointer corresponding to the multiplexing slot 18 in the calendar B | Service pointer corresponding to the multiplexing slot 19 in the calendar B |

Reserved field (rows 21–22)

FIG. 11C

| | | | |
|---|---|---|---|
| 1 | 0 | Service ID=0x5555 transmitted in a slot 0 | |
| 2 | 0 | Service ID=0x5555 transmitted in a slot 1 | |
| 3 | 0 | Service ID=0x5555 transmitted in a slot 2 | |
| 4 | 0 | Service ID=0x5555 transmitted in a slot 3 | |
| 5 | 0 | Service ID=0x6666 transmitted in a slot 4 | |
| 6 | 0 | Service ID=0x6666 transmitted in a slot 5 | |
| 7 | 0 | Service ID=0x6666 transmitted in a slot 6 | |
| 8 | 0 | Service ID=0x6666 transmitted in a slot 7 | |
| 9 | 0 | Service ID=0x6666 transmitted in a slot 8 | |
| 10 | 0 | Service ID=0x6666 transmitted in a slot 9 | |
| 11 | 0 | Service ID=0x6666 transmitted in a slot 10 | |
| 12 | 0 | Service ID=0x6666 transmitted in a slot 11 | |
| 13 | 0 | Service ID=0x6666 transmitted in a slot 12 | |
| 14 | 0 | Service ID=0x6666 transmitted in a slot 13 | |
| 15 | 0 | Service ID=0x7777 transmitted in a slot 14 | |
| 16 | 0 | Service ID=0x7777 transmitted in a slot 15 | |
| 17 | 1 | Service ID=0x7777 transmitted in a slot 16 | |
| 18 | 1 | Service ID=0x7777 transmitted in a slot 17 | |
| 19 | 1 | Service ID=0x7777 transmitted in a slot 18 | |
| 20 | 1 | Service ID=0x7777 transmitted in a slot 19 | |
| 21 | 1 | Candidate service ID1=0xAAAA | |
| 22 | 1 | Candidate service ID2=0xBBBB | |
| 23 | 1 | Pointer=21 (0x15) of the slot 0 | Pointer=22 (0x16) of the slot 10 |
| 24 | 1 | Pointer=21 (0x15) of the slot 1 | Pointer=22 (0x16) of the slot 11 |
| 25 | 1 | Pointer=21 (0x15) of the slot 2 | Pointer=22 (0x16) of the slot 12 |
| 26 | 1 | Pointer=21 (0x15) of the slot 3 | Pointer=22 (0x16) of the slot 13 |
| 27 | 1 | Pointer=21 (0x15) of the slot 4 | Pointer=22 (0x16) of the slot 14 |
| 28 | 1 | Pointer=21 (0x15) of the slot 5 | Pointer=22 (0x16) of the slot 15 |
| 29 | 1 | Pointer=21 (0x15) of the slot 6 | Pointer=22 (0x16) of the slot 16 |
| 30 | 1 | Pointer=21 (0x15) of the slot 7 | Pointer=22 (0x16) of the slot 17 |
| 31 | 1 | Pointer=21 (0x15) of the slot 8 | Pointer=22 (0x16) of the slot 18 |
| 32 | 1 | Pointer=21 (0x15) of the slot 9 | Pointer=22 (0x16) of the slot 19 |

Reserved field: rows 21–32

FIG. 13

| | | | |
|---|---|---|---|
| 1 | 0 | Service ID=0x5555 transmitted in a slot 0 | |
| 2 | 0 | Service ID=0x5555 transmitted in a slot 1 | |
| 3 | 0 | Service ID=0x5555 transmitted in a slot 2 | |
| 4 | 0 | Service ID=0x5555 transmitted in a slot 3 | |
| 5 | 0 | Service ID=0x6666 transmitted in a slot 4 | |
| 6 | 0 | Service ID=0x6666 transmitted in a slot 5 | |
| 7 | 0 | Service ID=0x6666 transmitted in a slot 6 | |
| 8 | 0 | Service ID=0x6666 transmitted in a slot 7 | |
| 9 | 0 | Service ID=0x6666 transmitted in a slot 8 | |
| 10 | 0 | Service ID=0x6666 transmitted in a slot 9 | |
| 11 | 0 | Service ID=0x6666 transmitted in a slot 10 | |
| 12 | 0 | Service ID=0x6666 transmitted in a slot 11 | |
| 13 | 0 | Service ID=0x6666 transmitted in a slot 12 | |
| 14 | 0 | Service ID=0x6666 transmitted in a slot 13 | |
| 15 | 0 | Service ID=0x7777 transmitted in a slot 14 | |
| 16 | 0 | Service ID=0x7777 transmitted in a slot 15 | |
| 17 | 1 | Service ID=0x7777 transmitted in a slot 16 | |
| 18 | 1 | Service ID=0x7777 transmitted in a slot 17 | |
| 19 | 1 | Service ID=0x7777 transmitted in a slot 18 | |
| 20 | 1 | Service ID=0xAAAA transmitted in a slot 19 | |
| 21 | 1 | Candidate service ID1=0xAAAA | |
| 22 | 1 | Candidate service ID2=0xBBBB | |
| 23 | 1 | Pointer=21 (0x15) of the slot 0 | Pointer=22 (0x16) of the slot 10 |
| 24 | 1 | Pointer=21 (0x15) of the slot 1 | Pointer=22 (0x16) of the slot 11 |
| 25 | 1 | Pointer=21 (0x15) of the slot 2 | Pointer=22 (0x16) of the slot 12 |
| 26 | 1 | Pointer=21 (0x15) of the slot 3 | Pointer=22 (0x16) of the slot 13 |
| 27 | 1 | Pointer=21 (0x15) of the slot 4 | Pointer=22 (0x16) of the slot 14 |
| 28 | 1 | Pointer=21 (0x15) of the slot 5 | Pointer=22 (0x16) of the slot 15 |
| 29 | 1 | Pointer=21 (0x15) of the slot 6 | Pointer=22 (0x16) of the slot 16 |
| 30 | 1 | Pointer=21 (0x15) of the slot 7 | Pointer=22 (0x16) of the slot 17 |
| 31 | 1 | Pointer=21 (0x15) of the slot 8 | Pointer=22 (0x16) of the slot 18 |
| 32 | 1 | Pointer=21 (0x15) of the slot 9 | Pointer=0 (0x00) of the slot 19 |

Reserved field: rows 23–32

FIG. 14

| | | | |
|---|---|---|---|
| 1 | 0 | Service ID=0x5555 transmitted in a slot 0 | |
| 2 | 0 | Service ID=0x5555 transmitted in a slot 1 | |
| 3 | 0 | Service ID=0x5555 transmitted in a slot 2 | |
| 4 | 0 | Service ID=0x5555 transmitted in a slot 3 | |
| 5 | 0 | Service ID=0x6666 transmitted in a slot 4 | |
| 6 | 0 | Service ID=0x6666 transmitted in a slot 5 | |
| 7 | 0 | Service ID=0x6666 transmitted in a slot 6 | |
| 8 | 0 | Service ID=0x6666 transmitted in a slot 7 | |
| 9 | 0 | Service ID=0x6666 transmitted in a slot 8 | |
| 10 | 0 | Service ID=0x6666 transmitted in a slot 9 | |
| 11 | 0 | Service ID=0x6666 transmitted in a slot 10 | |
| 12 | 0 | Service ID=0x6666 transmitted in a slot 11 | |
| 13 | 0 | Service ID=0x6666 transmitted in a slot 12 | |
| 14 | 0 | Service ID=0x6666 transmitted in a slot 13 | |
| 15 | 0 | Service ID=0x7777 transmitted in a slot 14 | |
| 16 | 0 | Service ID=0x7777 transmitted in a slot 15 | |
| 17 | 1 | Service ID=0x7777 transmitted in a slot 16 | |
| 18 | 1 | Service ID=0x7777 transmitted in a slot 17 | |
| 19 | 1 | Service ID=0x7777 transmitted in a slot 18 | |
| 20 | 1 | Service ID=0xAAAA transmitted in a slot 19 | |
| 21 | 1 | Candidate service ID1=0xBBBB | |
| 22 | 1 | Candidate service ID2=0xCCCC | |
| 23 | 1 | Pointer=20 (0x14) of the slot 0 | Pointer=21 (0x15) of the slot 10 |
| 24 | 1 | Pointer=20 (0x14) of the slot 1 | Pointer=21 (0x15) of the slot 11 |
| 25 | 1 | Pointer=20 (0x14) of the slot 2 | Pointer=21 (0x15) of the slot 12 |
| 26 | 1 | Pointer=20 (0x14) of the slot 3 | Pointer=21 (0x15) of the slot 13 |
| 27 | 1 | Pointer=20 (0x14) of the slot 4 | Pointer=21 (0x15) of the slot 14 |
| 28 | 1 | Pointer=20 (0x14) of the slot 5 | Pointer=21 (0x15) of the slot 15 |
| 29 | 1 | Pointer=20 (0x14) of the slot 6 | Pointer=21 (0x15) of the slot 16 |
| 30 | 1 | Pointer=20 (0x14) of the slot 7 | Pointer=22 (0x16) of the slot 17 |
| 31 | 1 | Pointer=20 (0x14) of the slot 8 | Pointer=22 (0x16) of the slot 18 |
| 32 | 1 | Pointer=20 (0x14) of the slot 9 | Pointer=0 (0x00) of the slot 19 |

Reserved field: rows 21–32

FIG. 15

| | | | | |
|---|---|---|---|---|
| 1 | 0 | Service ID carried in a calendar A in a slot 0 | | |
| 2 | 0 | Service ID carried in the calendar A in a slot 1 | | |
| 3 | 0 | Service ID carried in the calendar A in a slot 2 | | |
| 4 | 0 | Service ID carried in the calendar A in a slot 3 | | |
| 5 | 0 | Service ID carried in the calendar A in a slot 4 | | |
| 6 | 0 | Service ID carried in the calendar A in a slot 5 | | |
| 7 | 0 | Service ID carried in the calendar A in a slot 6 | | |
| 8 | 0 | Service ID carried in the calendar A in a slot 7 | | |
| 9 | 0 | Service ID carried in the calendar A in a slot 8 | | |
| 10 | 0 | Service ID carried in the calendar A in a slot 9 | | |
| 11 | 0 | Service ID carried in the calendar A in a slot 10 | | |
| 12 | 0 | Service ID carried in the calendar A in a slot 11 | | |
| 13 | 0 | Service ID carried in the calendar A in a slot 12 | | |
| 14 | 0 | Service ID carried in the calendar A in a slot 13 | | |
| 15 | 0 | Service ID carried in the calendar A in a slot 14 | | |
| 16 | 0 | Service ID carried in the calendar A in a slot 15 | | |
| 17 | 1 | Service ID carried in the calendar A in a slot 16 | | |
| 18 | 1 | Service ID carried in the calendar A in a slot 17 | | |
| 19 | 1 | Service ID carried in the calendar A in a slot 18 | | |
| 20 | 1 | Service ID carried in the calendar A in a slot 19 | | |
| 21 | 1 | Candidate service ID1 | | |
| 22 | 1 | Candidate service ID2 | | |
| 23 | 1 | Candidate service ID3 | | |
| 24 | 1 | Candidate service ID4 | | |
| 25 | 1 | Candidate service ID5 | | |
| 26 | 1 | R | Pointer of the slot 0 | Pointer of the slot 1 | Pointer of the slot 2 |
| 27 | 1 | R | Pointer of the slot 3 | Pointer of the slot 4 | Pointer of the slot 5 |
| 28 | 1 | R | Pointer of the slot 6 | Pointer of the slot 7 | Pointer of the slot 8 |
| 29 | 1 | R | Pointer of the slot 9 | Pointer of the slot 10 | Pointer of the slot 11 |
| 30 | 1 | R | Pointer of the slot 12 | Pointer of the slot 13 | Pointer of the slot 14 |
| 31 | 1 | R | Pointer of the slot 15 | Pointer of the slot 16 | Pointer of the slot 17 |
| 32 | 1 | R | Pointer of the slot 18 | Pointer of the slot 19 | Reserved |

Reserved field (rows 21–32)

FIG. 16

| 1 | 0 | Service ID carried in a calendar A in a slot 0 |
|---|---|---|
| 2 | 0 | Service ID carried in the calendar A in a slot 1 |
| 3 | 0 | Service ID carried in the calendar A in a slot 2 |
| 4 | 0 | Service ID carried in the calendar A in a slot 3 |
| 5 | 0 | Service ID carried in the calendar A in a slot 4 |
| 6 | 0 | Service ID carried in the calendar A in a slot 5 |
| 7 | 0 | Service ID carried in the calendar A in a slot 6 |
| 8 | 0 | Service ID carried in the calendar A in a slot 7 |
| 9 | 0 | Service ID carried in the calendar A in a slot 8 |
| 10 | 0 | Service ID carried in the calendar A in a slot 9 |
| 11 | 0 | Service ID carried in the calendar A in a slot 10 |
| 12 | 0 | Service ID carried in the calendar A in a slot 11 |
| 13 | 0 | Service ID carried in the calendar A in a slot 12 |
| 14 | 0 | Service ID carried in the calendar A in a slot 13 |
| 15 | 0 | Service ID carried in the calendar A in a slot 14 |
| 16 | 0 | Service ID carried in the calendar A in a slot 15 |
| 17 | 1 | Service ID carried in the calendar A in a slot 16 |
| 18 | 1 | Service ID carried in the calendar A in a slot 17 |
| 19 | 1 | Service ID carried in the calendar A in a slot 18 |
| 20 | 1 | Service ID carried in the calendar A in a slot 19 |

| | | |
|---|---|---|
| 1 | 0 | Service ID carried in a calendar A in a slot 0 |
| 2 | 0 | Service ID carried in the calendar A in a slot 1 |
| 3 | 0 | Service ID carried in the calendar A in a slot 2 |
| 4 | 0 | Service ID carried in the calendar A in a slot 3 |
| 5 | 0 | Service ID carried in the calendar A in a slot 4 |
| 6 | 0 | Service ID carried in the calendar A in a slot 5 |
| 7 | 0 | Service ID carried in the calendar A in a slot 6 |
| 8 | 0 | Service ID carried in the calendar A in a slot 7 |
| 9 | 0 | Service ID carried in the calendar A in a slot 8 |
| 10 | 0 | Service ID carried in the calendar A in a slot 9 |
| 11 | 0 | Service ID carried in the calendar A in a slot 10 |
| 12 | 0 | Service ID carried in the calendar A in a slot 11 |
| 13 | 0 | Service ID carried in the calendar A in a slot 12 |
| 14 | 0 | Service ID carried in the calendar A in a slot 13 |
| 15 | 0 | Service ID carried in the calendar A in a slot 14 |
| 16 | 0 | Service ID carried in the calendar A in a slot 15 |
| 17 | 1 | Service ID carried in the calendar A in a slot 16 |
| 18 | 1 | Service ID carried in the calendar A in a slot 17 |
| 19 | 1 | Service ID carried in the calendar A in a slot 18 |
| 20 | 1 | Service ID carried in the calendar A in a slot 19 |
| 21 | 1 | Candidate service ID1 |
| 22 | 1 | Candidate service ID2 |
| 23 | 1 | Candidate service ID3 |
| 24 | 1 | Candidate service ID4 |
| 25 | 1 | Candidate service ID5 |
| 26 | 1 | Candidate service ID6 |
| 27 | 1 | Candidate service ID7 |
| 28 | 1 | Candidate service ID8 |
| 29 | 1 | Candidate service ID9 |
| 30 | 1 | Candidate service ID10 |
| 31 | 1 | Candidate service ID11 |
| 32 | 1 | Candidate service ID12 |

Rows 21–32: Reserved field

| SH | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 1 | 0 | | 0x4B | | | | | | | | | | | | | | Map | | | | | | | | | | | | | CRC4 | | | |

| | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| 0xA | | | | | | | | | | | | | | | | | | | | 0x0000_0000 | | | | | | | | | | | | |

| SH | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 1 | 0 | | 0x4B | | | | | | 1 | 1 | 0 | 0 | 0 | 0 | 0 | 0 | 1 | 1 | 1 | 1 | 1 | 1 | 0 | 0 | 0 | 1 | 1 | 1 | CRC4 | | | |

| | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| 0xA | | | | | | | | | | | | | | | | | | | | 0x0000_0000 | | | | | | | | | | | | |

FIG. 27

METHOD AND APPARATUS FOR TRANSMITTING SERVICE DATA

CROSS-REFERENCE TO RELATED APPLICATIONS

This application is a continuation of International Application No. PCT/CN2020/108047, filed on Aug. 10, 2020, which claims priority to Chinese Patent Application No. 201910745224.8, filed on Aug. 13, 2019. The disclosures of the aforementioned applications are hereby incorporated by reference in their entireties.

TECHNICAL FIELD

This application relates to the communications field, and more specifically, to a method and an apparatus for transmitting service data.

BACKGROUND

A time division multiplexing (TDM) technology is widely used in a synchronous digital hierarchy (SDH), a plesiochronous digital hierarchy (PDH), and an optical transport network (OTN) to multiplex a plurality of services on an interface or a frame interface of a transmission channel. A fixed bandwidth is configured for each service, and services are strictly isolated from each other. In other words, even if an effective bandwidth of a service is far lower than a bandwidth configured for the service, other services cannot share the bandwidth configured for the service. A TDM mechanism is introduced into an Ethernet interface in a flexible Ethernet (FlexE), and the foregoing feature of the TDM mechanism also exists, leading to a waste of bandwidth resources and low network utilization.

SUMMARY

Example embodiments of this application provide a method and an apparatus for transmitting service data, to reduce a waste of bandwidth resources and improve network utilization.

According to a first aspect, this application provides a method for transmitting service data. The method includes: obtaining a to-be-sent first data block section; replacing target data blocks in the first data block section with data blocks of M first services to obtain a second data block section, where each of the target data blocks is a preset type of data block, and M is an integer greater than 1; and sending the second data block section.

Optionally, the first service may be a candidate service or a service with a relatively low priority.

Optionally, the first data block section belongs to at least one exclusive service, and the exclusive service is a service to which a fixed bandwidth is allocated. A data stream to which the first data block section belongs is a data stream obtained after TDM is performed on a plurality of services to which fixed bandwidths are allocated.

In the foregoing technical solution, data of at least two first services may be transmitted in a preset type of data block in a first data stream section. When the preset type indicates that the data block is a data block in which no service data or control information is transmitted, or in other words, a service to which the first data block section belongs does not completely occupy a bandwidth resource allocated to the service, data transmission of the first service on an actually unused bandwidth is supported. In this way, a waste of bandwidth resources can be reduced and network utilization can be improved.

In a possible implementation, the replacing target data blocks in the first data block section with data blocks of M first services includes: replacing the target data blocks in the first data block section with the data blocks of the M first services based on a multiplexing relationship and first information, where the multiplexing relationship is a correspondence between the M first services and locations of data blocks in the first data block section, and the first information is used to indicate locations of the target data blocks in the first data block section.

In the foregoing technical solution, there is a fixed correspondence between the M first services and the locations of the data blocks in the first data block section. In this case, when a data block at a location is a target data block, the data block at the location may be replaced with a data block of a first service, to use idle bandwidths in the first data block section. This reduces a waste of bandwidth resources and improves network utilization.

In a possible implementation, the replacing target data blocks in the first data block section with data blocks of M first services includes: replacing the target data blocks in the first data block section with the data blocks of the M first services in a preset sequence based on first information, where the preset sequence is an arrangement sequence of the M first services during replacement of the target data blocks with the data blocks of the M first services, and the first information is used to indicate locations of the target data blocks in the first data block section.

In the foregoing technical solution, the target data blocks are successively replaced with the data blocks of the M first services in the preset sequence based on information about the locations of the target data blocks in the first data block section. In this way, because the correspondence between the M first services and the locations of data blocks in the first data block section is not fixed, the idle bandwidths in the first data block section can be more flexibly used.

In a possible implementation, the preset sequence is a polling sequence, and the method further includes: sending second information, where the second information is used to indicate a location, in the first data block section, of the first target data block used to carry the 1st first service in the M first services.

It can be understood that, the polling sequence is a periodic cycle of the M first services arranged in a specific sequence. For example, when M is 4, the four first services, and a polling sequence may be A, B, C, D, A, B, C, D, A . . . , or may be D, C, B, A, D, C, B, A, D . . . , or may be A, A, B, C, D, A, A, B, C, D, A, A . . . A specific arrangement sequence is not limited in embodiments of this application.

In the foregoing technical solution, based on the arrangement sequence of the M first services and the second information, a receive end device can determine the first services to be transmitted after the target data blocks are replaced. Therefore, the correspondence between the locations of the target data blocks and the first services does not need to be transmitted in real time, and only a location at which the receive end device starts to perform polling for the first time needs to be indicated by using a smaller overhead. This can reduce overheads and improve network utilization.

In addition, different arrangement sequences may be set to implement fair transmission of M candidate services.

In a possible implementation, the polling sequence is a weighted polling sequence.

The weighted polling sequence may be understood as follows: The M first services have different weights. A larger weight of a first service indicates that the first service occupies more data blocks in a polling process, and a smaller weight of a first service indicates that the first service occupies fewer data blocks in a polling process. For example, M=4 first services are respectively A, B, C, and D, and a weighted polling sequence may be A, A, B, C, D, A, A, B, C, D, A, A, ... A specific arrangement sequence is not limited in the embodiments of this application.

In the foregoing technical solution, different first services may have different weights, so that the M first services can be transmitted according to a specific bandwidth allocation proportion.

In a possible implementation, the method further includes: sending third information, where the third information is used to indicate the multiplexing relationship.

In the foregoing technical solution, a transmit end device sends the multiplexing relationship to the receive end device. In this way, when a quantity of first services, the multiplexing relationship, and the like change, the receive end device may synchronously perform adjustment to correctly receive each service.

In a possible implementation, the sending third information includes: sending the third information by using overhead data blocks in the data stream to which the first data block section belongs.

In the foregoing technical solution, the overhead data blocks in the data stream to which the first data block section belongs are used to send the third information, so that no new overheads are caused, and no waste of network resources is increased.

In a possible implementation, the overhead data blocks include a first part and a second part, the first part is used to transmit IDs of the M first services, the second part is used to transmit multiplexing service pointers, and the multiplexing service pointers are used to indicate first services corresponding to data blocks in the first data block section.

In a possible implementation, the first data block section includes 20 data blocks, and the overhead data blocks include 32 overhead data blocks transmitted in one overhead multiframe. The 1st to 20th data blocks in the 32 overhead data blocks are used to transmit slot configuration information of one or more second services, the 21st and 22nd data blocks are used to transmit the IDs of the M first services, the 23rd to 32nd data blocks are used to transmit 20 multiplexing service pointers, and the first service is different from the second service; or the 1st to 20th data blocks in the 32 overhead data blocks are used to transmit slot configuration information of one or more second services, the 21st to 25th data blocks are used to transmit the IDs of the M first services, the 26th to 32nd data blocks are used to transmit 20 multiplexing service pointers, and the first service is different from the second service; or the 1st to 20th data blocks in the 32 overhead data blocks are used to transmit slot configuration information of one or more second services, the 21st to 27th data blocks are used to transmit the IDs of the M first services, the 28th to 32nd data blocks are used to transmit 20 multiplexing service pointers, and the first service is different from the second service; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, and an ID of a first service transmitted in the 20th data block is the same as an ID of a first service transmitted in the 21st or 22nd data block; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, an ID of a first service transmitted in the 20th data block is different from an ID of a first service transmitted in the 21st or 22nd data block, and a value range of the multiplexing service pointers includes 0-22.

In a possible implementation, the method further includes: sending at least one piece of the first information.

When the target data blocks are not data blocks reserved for the first services, in the foregoing technical solution, data blocks in the second data block section that are data blocks of the first services may be indicated to the receive end device by using the first information, so that the receive end device can correctly extract the data blocks of the first services.

In a possible implementation, the second data block section includes at least one piece of the first information.

In a possible implementation, the first information occupies one target data block, and the method further includes: detecting the target data blocks in the first data block section, and generating the first information; and determining the target data block occupied by the first information.

In a possible implementation, the determining the target data block occupied by the first information includes: determining, based on sequence numbers of the target data blocks, the target data block occupied by the first information; or determining, based on a quantity of times the first information is transmitted in a slot corresponding to each of the target data blocks, the target data block occupied by the first information; or determining, based on a quantity of times a target data block appears in a slot corresponding to each of the target data blocks, the target data block occupied by the first information.

In the foregoing technical solution, based on the sequence numbers of the target data blocks, the quantity of times the first information is transmitted, or the quantity of times a target data block appears, a case in which the first information is transmitted by always using a target data block corresponding to a relatively small number can be avoided as much as possible, thereby implementing fair transmission of the M first services.

In a possible implementation, the preset type includes a null type and/or a reserved type, and the reserved type indicates that the data block is a data block reserved for the M first services.

In a possible implementation, one target data block corresponds to one slot, and the slot corresponds to a 1 Gbps bandwidth or a 5 Gbps bandwidth.

According to a second aspect, this application provides a method for transmitting service data. The method includes: receiving a second data block section, where the second data block section is obtained by replacing target data blocks in a first data block section with data blocks of M first services, the target data block is a preset type of data block, and M is an integer greater than 1; and extracting the data blocks of the M first services from the second data block section, and restoring the second data block section to the first data block section.

Optionally, the first service may be a candidate service or a service with a relatively low priority.

Optionally, the first data block section belongs to at least one exclusive service, and the exclusive service is a service to which a fixed bandwidth is allocated. A data stream to which the first data block section belongs is a data stream obtained after TDM is performed on data streams of a plurality of services to which fixed bandwidths are allocated.

In the foregoing technical solution, data of at least two first services may be transmitted in a preset type of data block in a first data stream section. When the preset type indicates that the data block is a data block in which no service data or control information is transmitted, or in other words, a service to which the first data block section belongs does not completely occupy a bandwidth resource allocated to the service, data transmission of the first service on an actually unused bandwidth is supported. In this way, a waste of bandwidth resources can be reduced and network utilization can be improved.

In a possible implementation, the extracting the data blocks of the M first services from the second data block section includes: extracting the data blocks of the M first services from the second data block section based on a multiplexing relationship and first information, where the multiplexing relationship is a correspondence between the M first services and locations of data blocks in the first data block section, and the first information is used to indicate locations of the target data blocks in the first data block section.

In the foregoing technical solution, there is a fixed correspondence between the M first services and the locations of the data blocks in the first data block section. In this case, when a data block at a location is a target data block, the data block at the location may be replaced with a data block of a first service, to use idle bandwidths in the first data block section. This reduces a waste of bandwidth resources and improves network utilization.

In a possible implementation, the extracting the data blocks of the M first services from the second data block section includes: extracting the data blocks of the M first services from the second data block section in a preset sequence based on first information, where the preset sequence is an arrangement sequence of the M first services during replacement of the target data blocks with the data blocks of the M first services, and the first information is used to indicate locations of the target data blocks in the first data block section.

In the foregoing technical solution, the target data blocks are successively replaced with the data blocks of the M first services in the preset sequence based on information about the locations of the target data blocks in the first data block section. In this way, because the correspondence between the M first services and the locations of data blocks in the first data block section is not fixed, the idle bandwidths in the first data block section can be more flexibly used.

In a possible implementation, the preset sequence is a polling sequence, and the method further includes: receiving second information, where the second information is used to indicate a location, in the first data block section, of the first target data block used to carry the 1st first service in the M first services.

It can be understood that, the polling sequence is a periodic cycle of the M first services arranged in a specific sequence. For example, M=4 first services are respectively A, B, C, and D, and the polling sequence may be A, B, C, D, A, B, C, D, A . . . , or may be D, C, B, A, D, C, B, A, D . . . , or may be A, A, B, C, D, A, A, B, C, D, A, A . . . . A specific arrangement sequence is not limited in the embodiments of this application.

In the foregoing technical solution, based on the arrangement sequence of the M first services and the second information, a receive end device can determine the first services to be transmitted after the target data blocks are replaced. Therefore, the correspondence between the locations of the target data blocks and the first services does not need to be transmitted in real time, and only a location at which the receive end device starts to perform polling for the first time needs to be indicated by using a smaller overhead. This can reduce overheads and improve network utilization.

In addition, different arrangement sequences may be set to implement fair transmission of M candidate services.

In a possible implementation, the polling sequence is a weighted polling sequence.

The weighted polling sequence may be understood as follows: The M first services have different weights. A larger weight of a first service indicates that the first service occupies more data blocks in a polling process, and a smaller weight of a first service indicates that the first service occupies fewer data blocks in a polling process. For example, M=4 first services are respectively A, B, C, and D, and a weighted polling sequence may be A, A, B, C, D, A, A, B, C, D, A, A, . . . A specific arrangement sequence is not limited in the embodiments of this application.

In the foregoing technical solution, different first services may have different weights, so that the M first services can be transmitted according to a specific bandwidth allocation proportion.

In a possible implementation, the method further includes: receiving third information, where the third information is used to indicate the multiplexing relationship.

In the foregoing technical solution, a transmit end device sends the multiplexing relationship to the receive end device. In this way, when a quantity of first services, the multiplexing relationship, and the like change, the receive end device may synchronously perform adjustment to correctly receive each service.

In a possible implementation, the third information is carried in overhead data blocks in the data stream to which the first data block section belongs.

In the foregoing technical solution, the overhead data blocks in the data stream to which the first data block section belongs are used to send the third information, so that no new overheads are caused, and no waste of network resources is increased.

In a possible implementation, the overhead data blocks include a first part and a second part, the first part is used to transmit IDs of the M first services, the second part is used to transmit multiplexing service pointers, and the multiplexing service pointers are used to indicate first services corresponding to data blocks in the first data block section.

In a possible implementation, the first data block section includes 20 data blocks, and the overhead data blocks include 32 overhead data blocks transmitted in one overhead multiframe. The 1st to 20th data blocks in the 32 overhead data blocks are used to transmit slot configuration information of one or more second services, the 21st and 22nd data blocks are used to transmit the IDs of the M first services, the 23rd to 32nd data blocks are used to transmit 20 multiplexing service pointers, and the first service is different from the second service; or the 1st to 20th data blocks in the 32 overhead data blocks are used to transmit slot configuration information of one or more second services, the 21st to 25th data blocks are used to transmit the IDs of the M first services, the 26th to 32nd data blocks are used to transmit 20 multiplexing service pointers, and the first service is different from the second service; or the 1st to 20th data blocks in the 32 overhead data blocks are used to transmit slot configuration information of one or more second services, the 21st to 27th data blocks are used to transmit the IDs of the M first services, the 28th to 32nd data blocks are used to transmit 20 multiplexing service pointers, and the first service is different from the second service; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, and an ID of a first service transmitted in the 20th data block is the same as an ID of a first service transmitted in the 21st or 22nd data block; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, an ID of a first service transmitted in the 20th data block is different from an ID of a first service transmitted in the 21st or 22nd data block, and a value range of the multiplexing service pointers includes 0-22.

In a possible implementation, the method further includes: receiving at least one piece of the first information.

When the target data blocks are not data blocks reserved for the first services, in the foregoing technical solution, data blocks in the second data block section that are data blocks of the first services may be indicated to the receive end device by using the first information, so that the receive end device can correctly extract the data blocks of the first services.

In a possible implementation, the second data block section includes at least one piece of the first information.

In a possible implementation, the preset type includes a null type and/or a reserved type, and the reserved type indicates that the data block is a data block reserved for the M first services.

In a possible implementation, one target data block corresponds to one slot, and the slot corresponds to a 1 Gbps bandwidth or a 5 Gbps bandwidth.

According to a third aspect, this application provides a data transmission apparatus, configured to implement the method according to the first aspect and/or any one of the possible implementations of the first aspect. The apparatus may be a communications device, an apparatus in a communications device, or an apparatus that can be used in cooperation with a communications device. In an example embodiment, the apparatus may include a module corresponding to performing the method/operation/step/action described in the first aspect and/or any one of the possible implementations of the first aspect. The module may be implemented by a hardware circuit, software, or a combination of a hardware circuit and software. In an example embodiment, the apparatus may include an obtaining module, a processing module, and a sending module.

According to a fourth aspect, this application provides a data transmission apparatus, configured to implement the method according to the second aspect and/or any one of the possible implementations of the second aspect. The apparatus may be a communications device, an apparatus in a communications device, or an apparatus that can be used in cooperation with a communications device. In an example embodiment, the apparatus may include a module corresponding to performing the method/operation/step/action described in the second aspect and/or any one of the possible implementations of the second aspect. The module may be implemented by a hardware circuit, software, or a combination of a hardware circuit and software. In an example embodiment, the apparatus may include a receiving module and a processing module.

According to a fifth aspect, this application provides a data transmission apparatus. The apparatus includes a processor, configured to implement the method described in the first aspect and/or any one of the possible implementations of the first aspect. The apparatus may further include a memory. Optionally, the memory is configured to store instructions. When executing the instructions stored in the memory, the processor can implement the method according to any one of the first aspect and/or the possible implementations of the first aspect. The apparatus may further include a communication interface. The communication interface is configured for communication between the apparatus and another device. For example, the communication interface may be a transceiver, a circuit, a bus, a module, a pin, or another type of communication interface.

According to a sixth aspect, this application provides a data transmission apparatus. The apparatus includes a processor, configured to implement the method described in the second aspect and/or any one of the possible implementations of the second aspect. The apparatus may further include a memory. Optionally, the memory is configured to store instructions. When executing the instructions stored in the memory, the processor can implement the method according to any one of the second aspect and/or the possible implementations of the second aspect. The apparatus may further include a communication interface, and the communication interface is configured for communication between the apparatus and another device.

According to a seventh aspect, this application provides a chip. The chip is connected to a memory, and is configured to read and execute a software program stored in the memory, to implement the method according to any one of the first aspect or the implementations of the first aspect.

According to an eighth aspect, this application provides a chip. The chip is connected to a memory, and is configured to read and execute a software program stored in the memory, to implement the method according to any one of the second aspect or the implementations of the second aspect.

According to a ninth aspect, this application provides a computer-readable storage medium, including instructions. When the instructions are run on an apparatus for transmitting service data, the apparatus for transmitting service data is enabled to perform the method according to any one of the first aspect or the implementations of the first aspect.

According to a tenth aspect, this application provides a computer-readable storage medium, including instructions. When the instructions are run on an apparatus for transmitting service data, the apparatus for transmitting service data is enabled to perform the method according to any one of the second aspect or the implementations of the second aspect.

According to an eleventh aspect, this application provides a computer program product. When the computer program product is run on an apparatus for transmitting service data, the apparatus for transmitting service data is enabled to perform the method according to any one of the first aspect or the implementations of the first aspect.

According to a twelfth aspect, this application provides a computer program product. When the computer program product is run on an apparatus for transmitting service data, the apparatus for transmitting service data is enabled to perform the method according to any one of the second aspect or the implementations of the second aspect.

According to a thirteenth aspect, this application provides a communications system. The system includes the apparatus provided in the third aspect and the apparatus provided in the fourth aspect, or the system includes the apparatus provided in the fifth aspect and the apparatus provided in the sixth aspect.

BRIEF DESCRIPTION OF DRAWINGS

FIG. 4 is a schematic diagram of a data frame format of a first data stream according to an embodiment of this application;

FIG. 5 is a schematic distribution diagram of target data blocks according to an embodiment of this application;

FIG. 9 is a schematic distribution diagram of a plurality of hybrid multiplexing overhead blocks according to an embodiment of this application;

FIG. 10A and FIG. 10B are a schematic diagram of a frame format of a FlexE overhead multiframe;

FIG. 11A, FIG. 11B, and FIG. 11C are a schematic diagram of a frame format of a FlexE overhead multiframe according to an embodiment of this application;

FIG. 13 is a schematic diagram of a frame format of a FlexE overhead multiframe according to another embodiment of this application;

FIG. 14 is a schematic diagram of a frame format of a FlexE overhead multiframe according to another embodiment of this application;

FIG. 15 is a schematic diagram of a frame format of a FlexE overhead multiframe according to another embodiment of this application;

FIG. 16 is a schematic diagram of a frame format of a FlexE overhead multiframe according to another embodiment of this application;

FIG. 17A and FIG. 17B are a schematic diagram of a frame format of a FlexE overhead multiframe according to another embodiment of this application;

FIG. 22 is a schematic diagram of a frame format of a FlexE overhead multiframe according to another embodiment of this application;

FIG. 25 is a schematic diagram of hybrid multiplexing sections when 100 slots each with a granularity of 1 G are obtained through division based on a 100G Ethernet physical interface;

FIG. 26 is a schematic diagram of a format of a hybrid multiplexing overhead block when 100 slots each with a granularity of 1 G are obtained through division based on a 100G Ethernet physical interface;

FIG. 27 is a schematic diagram of extracting a map by a receive end device according to an embodiment of this application;

DESCRIPTION OF EMBODIMENTS

The following describes example technical solutions of this application with reference to accompanying drawings.

The technical solutions of the embodiments of this application may be applied to a flexible Ethernet, and may also be applied to other types of networks, for example, an Ethernet, a synchronous digital hierarchy (SDH) network, a plesiochronous digital hierarchy (PDH) network, and an optical transport network (OTN). In the embodiments of this application, a flexible Ethernet is used as an example to describe the technical solutions of this application.

A TDM mechanism is introduced into a current flexible Ethernet, or in other words, slots are obtained through division based on a bandwidth of a flexible Ethernet physical interface. For example, for a 100G flexible Ethernet physical interface, 20 slots each with a granularity of 5G may be obtained through division. For another example, for a 400G flexible Ethernet physical interface group formed by cascading four 100GE physical interfaces, 80 slots each with a granularity of 5G may be obtained through division. Each service may independently occupy several slots. It can be understood that, when a slot is configured for transmitting a service, this means that the slot is exclusively used by the service. For ease of description, a service that independently occupies several slots is referred to as an exclusive service.

Figure 1:
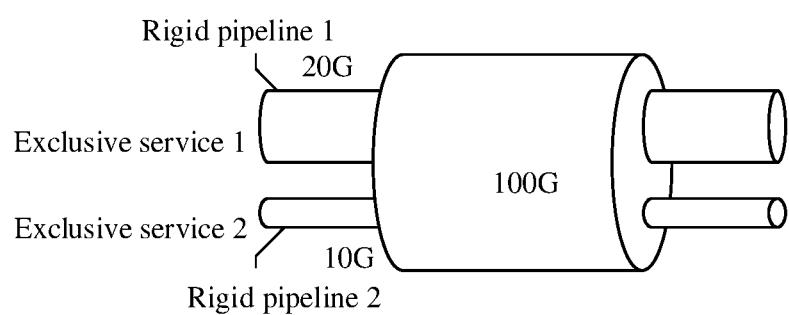
FIG. 1 is an example schematic diagram of allocating fixed bandwidths to exclusive services.

A fixed bandwidth is configured for each exclusive service, and services are strictly isolated from each other. In other words, when an effective bandwidth of an exclusive service is far less than a fixed bandwidth allocated to the exclusive service, other services cannot share the bandwidth allocated to the exclusive service. In the embodiments of this application, such isolation feature is referred to as hard isolation, and a service transmission pipeline provided based on hard isolation is a hard pipeline or a rigid pipeline. For example, as shown in FIG. 1, fixed bandwidths used to transmit corresponding services are allocated to two rigid pipelines on a 100G flexible Ethernet physical interface. To be specific, four slots are allocated to a rigid pipeline 1 to transmit an exclusive service 1. In this way, the exclusive service 1 independently occupies a 20G fixed bandwidth. Two slots are allocated to a rigid pipeline 2 to transmit an exclusive service 2. In this way, the exclusive service 2 independently occupies a 10G fixed bandwidth.

However, in a grouping scenario, because the services carried in the foregoing rigid pipelines are uncertain, statically allocated rigid pipelines cause a waste of bandwidth resources, and network utilization is relatively low.

For the foregoing problem, an embodiment of this application provides a method for transmitting service data, to reduce a waste of bandwidth resources and improve network utilization.

Figure 2:
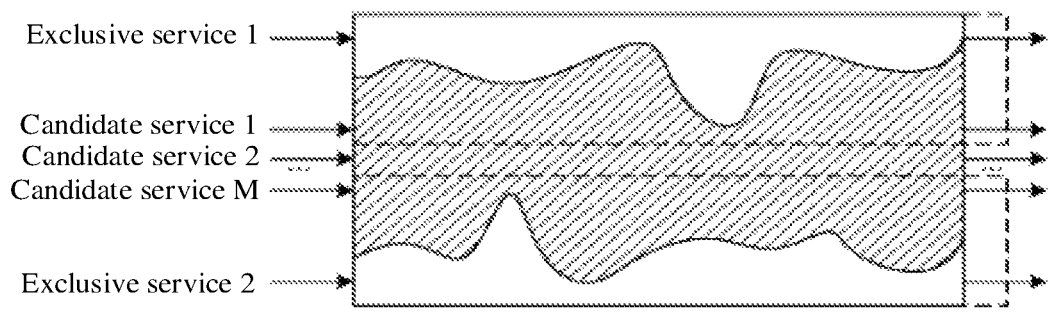
FIG. 2 is a schematic diagram of service transmission according to an embodiment of this application.

FIG. 2 is a schematic diagram of service transmission according to an embodiment of this application. An exclusive service 1 and an exclusive service 2 each independently occupy a fixed bandwidth on a physical interface. In FIG. 2, an unshaded part represents a bandwidth actually used by the exclusive service 1 and the exclusive service 2, and a shaded part represents a bandwidth that is not used. In this embodiment of this application, after time division multiplexing is performed on the exclusive services, hybrid multiplexing is further performed on the exclusive services and the candidate services to transmit, by using the bandwidth represented by the shaded part, a plurality of candidate services, that is, a candidate service 1 to a candidate service M, thereby fully utilizing the bandwidth resource.

Figure 3:
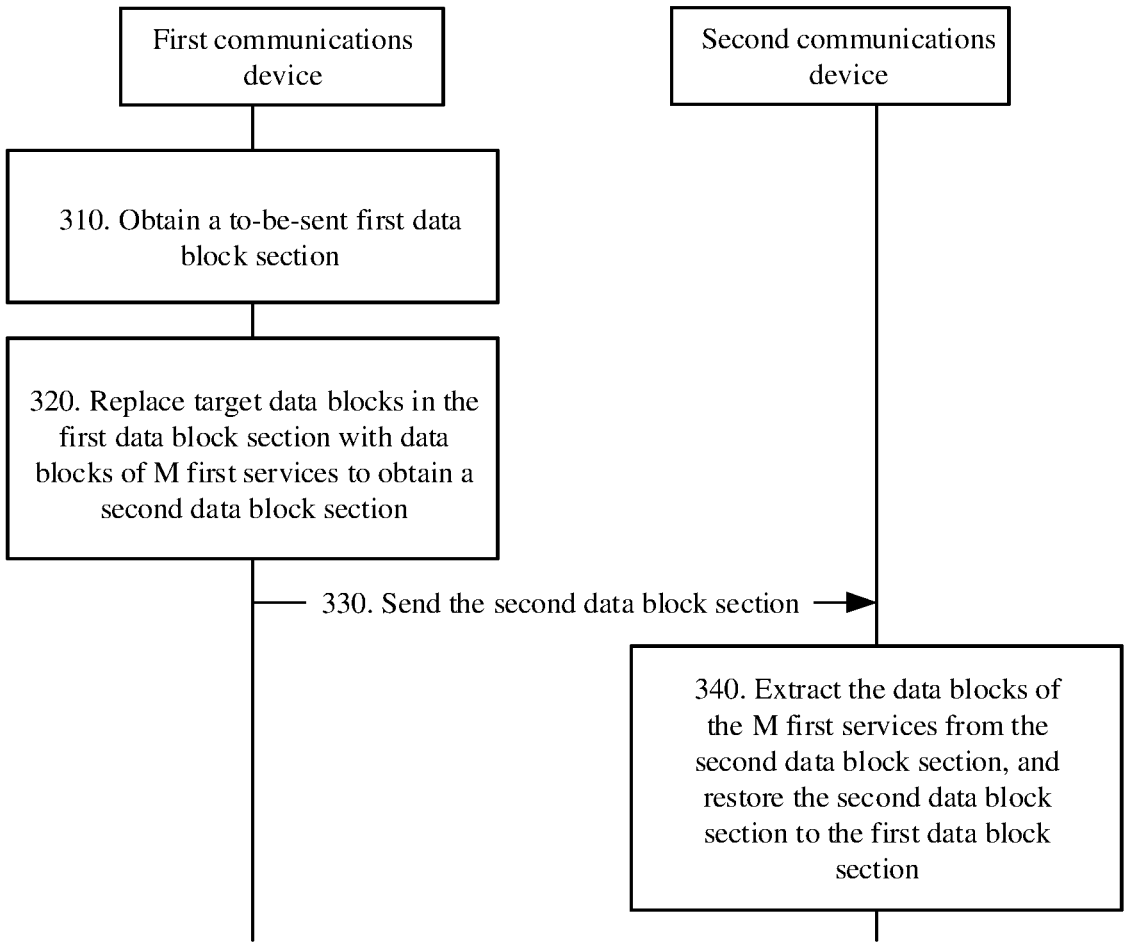
FIG. 3 is a schematic flowchart of a method for transmitting service data according to an embodiment of this application.

FIG. 3 is a schematic flowchart of a method for transmitting service data according to an embodiment of this application. In FIG. 3, a first communications device is a transmit end device, and a second communications device is a receive end device. In this embodiment, an example in which the first communications device and the second communications device serve as execution bodies is used for description. It should be understood that, the execution bodies may alternatively be a chip applied to the first communications device and a chip applied to the second communications device. This is not specifically limited in the embodiments of this application.

A type of the first communications device is not specifically limited in the embodiments of this application, provided that the first communications device can communicate with another communications device (for example, the second communications device) by using an Ethernet technology. For example, the first communications device is a fixed configuration switch, a modular configuration switch, or a router.

A type of the second communications device is not specifically limited in the embodiments of this application, provided that the second communications device can communicate with another communications device (for example, the first communications device) by using the Ethernet technology. For example, the second communications device is a fixed configuration switch, a modular configuration switch, or a router.

The method in FIG. 3 includes at least a part of the following content.

310. The first communications device obtains a to-be-sent first data block section.

That the first communications device obtains a first data block section may be: The first communications device may receive the first data block section from another device, or the first communications device may read the first data block section from a cache. This is not specifically limited in the embodiments of this application.

Figure 4:
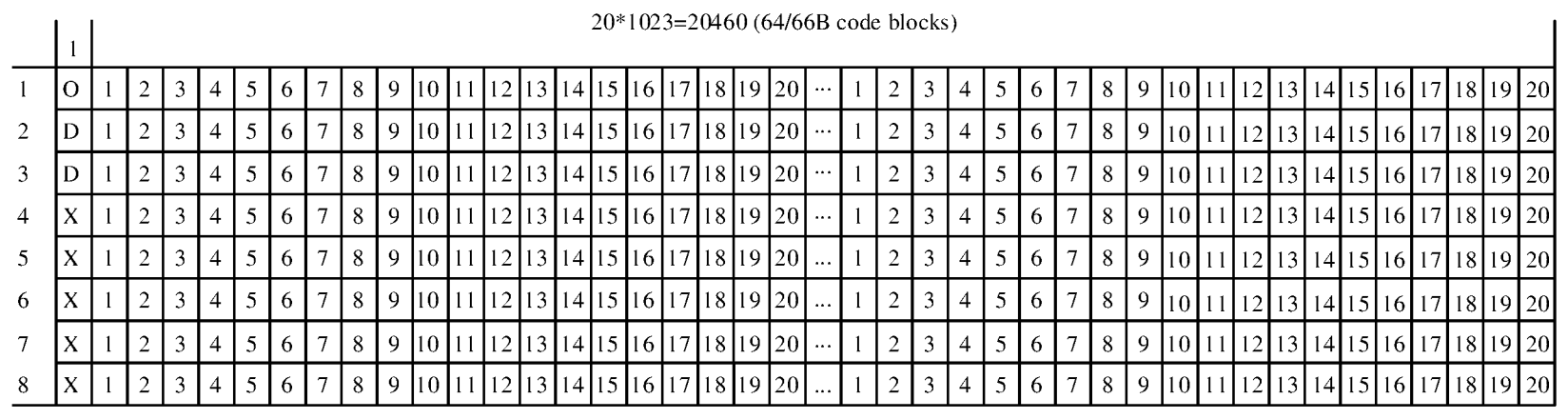

A data stream to which a first data stream section belongs (referred to as a first data stream below) may be a data stream of one exclusive service or a data stream obtained after time division multiplexing is performed on a plurality of exclusive services. Using a case in which 20 slots each with a granularity of 5G are obtained through division based on a 100G flexible Ethernet physical interface as an example, after time division multiplexing is performed on the plurality of exclusive services, a data frame format of the generated first data stream is shown in FIG. 4. A structure of a flexible Ethernet data frame formed on the 100G flexible Ethernet physical interface includes eight rows, and there are (1+20*1023) data blocks in each row. In the data frame structure, one row forms a subframe, 8 rows form a basic frame, and 32 rows form a multiframe. The data block herein may be a 64B/66B data block or a data block of another size. The first data block in each row is an overhead block, and the other 20*1023 data blocks are payload blocks. The payload blocks in each row may be grouped into 1023 sections by using 20 data blocks as a unit, and 20 data blocks in each section respectively correspond to 20 slots. For example, in each section, a data block whose identifier is 1 corresponds to a slot 1, a data block whose identifier is 2 corresponds to a slot 2, . . . , and a data block whose identifier is 20 corresponds to a slot 20.

It can be understood that, based on the 100G Ethernet physical interface, slots each with another granularity, for example, 100 slots each with a granularity of 1 G, 50 slots each with a granularity of 2G, 25 slots each with a granularity of 4G, or 10 slots each with a granularity of 10 G, may alternatively be obtained through division. This is not limited in the embodiments of this application. In this embodiment, an example in which 20 slots each with a granularity of 5G are obtained through division based on the 100G Ethernet physical interface is used to describe the technical solution of this application.

The first data block section may be a plurality of consecutive data blocks successively selected after an overhead data block, for example, 20 consecutive data blocks, 30 consecutive data blocks, 45 consecutive data blocks, 50 consecutive data blocks, 60 consecutive data blocks, or 120 consecutive data blocks.

It can be understood that, the first data block section may alternatively be a plurality of consecutive data blocks successively selected by performing positioning by using a periodic special code. For example, on the 100G Ethernet physical interface, one alignment marker (AM) code block is inserted after every 16,383 code blocks in a physical coding sub-layer (PCS) data channel. Therefore, after an AM code block, a plurality of consecutive data blocks, for example, 20 consecutive data blocks, 30 consecutive data blocks, 45 consecutive data blocks, 50 consecutive data blocks, 60 consecutive data blocks, or 120 consecutive data blocks, may be successively selected as the first data block section.

320. The first communications device replaces target data blocks in the first data block section with data blocks of M first services to obtain a second data block section, where each of the target data blocks is a preset type of data block, and M is an integer greater than 1.

The first data block section may include a data block that can be replaced, and the data block that can be replaced is referred to as a target data block below. The data block that can be replaced is a preset type of data block. For example, the preset type is a null type, a reserved type, or some special types. The null type indicates that the data block is an idle data block. The idle data block is a data block in which none of data of an exclusive service and control information are transmitted, or in other words, the idle data block is a data block that is not used by an exclusive service. The reserved type indicates that the data block is a data block reserved for the first service, and the data block cannot be occupied when time division multiplexing is performed on exclusive services. A special type indicates that the data block is a data block in which no effective data information is transmitted and that can be replaced. Because the data block can be replaced, a slot occupied by the data block may be considered as an idle slot. For example, the first data block section includes 20 data blocks. As shown in FIG. 5, the first data block section is one row of data blocks shown in FIG. 5. A target code block is a data block identified as "/I/", and a non-target data block is a data block identified as "D/C".

Optionally, the first service may be a candidate service or a service with a relatively low priority, and the candidate service and the service with a relatively low priority are collectively referred to as candidate services below.

A priority of an exclusive service is usually higher than that of a candidate service. On a premise that transmission of the exclusive service is ensured, when there is a target data block in a data stream of the exclusive service, the target data block is replaced with a data block of the candidate service, so as to transmit the candidate service by using an idle bandwidth and improve network utilization.

Before 320, the first communications device further needs to obtain M second data streams, which may be as follows: The first communications device may receive the M second data streams from another device, or the first communications device may read the M second data streams from a cache. This is not specifically limited in the embodiments of this application. The M second data streams respectively belong to the M candidate services.

It can be understood that, the first communications device may simultaneously obtain the first data block section and the M second data streams, may obtain the first data block section before the M second data streams, or may obtain the M second data streams before the first data block section. This is not specifically limited in the embodiments of this application.

In this embodiment, the M second data streams respectively belong to the M candidate services. In other words, when hybrid multiplexing is performed on the M candidate services for transmission, the corresponding second data streams are obtained. In this embodiment, there are two or more candidate services, and hybrid multiplexing on a plurality of candidate services and the first data stream can be supported, thereby fully utilizing resources.

To replace the target data blocks in the first data block section without affecting transmission of an exclusive service, before 320, after obtaining the first data block section, the first communications device may further perform detection on the first data block section to obtain first information. The first information is used to indicate locations of the target data blocks in the first data block section. There are a plurality of forms for the first information. For example, the first information may be a map shown in FIG. 5. The map may directly indicate a target data block. To be specific, a target data block is represented by "1", and a non-target data block is represented by "0". Alternatively, the map may indirectly indicate a target data block. To be specific, a non-target data block is represented by "1", and a target data block is represented by "0". The map may alternatively be presented in another form. This is not limited in the embodiments of this application. For example, in the map, other symbols may be used to represent a target data block and a non-target data block. The map may directly indicate a number of a slot occupied by a target data block, a data block number of a target data block, or the like. Optionally, each first data block section may correspond to one map, or a plurality of first data block sections may correspond to one map. This is not limited in the embodiments of this application.

The first communications device may further send the obtained first information to the second communications device, so that the second communications device correctly extracts data blocks of the candidate services based on the first information.

In an example, the first communications device may send the first information to the second communications device by using the first data stream. Optionally, the first communications device may occupy one detected target data block to send the first information. In this case, the first communications device needs to determine the target data block occupied by the first information. For ease of description, the target data block occupied by the first information is referred to as a hybrid multiplexing overhead (HOH) block below.

Specifically, the first communications device may determine the hybrid multiplexing overhead block based on sequence numbers of the target data blocks. For example, the first communications device transmits the first information in the first target data block in the first data block section.

Figure 6:
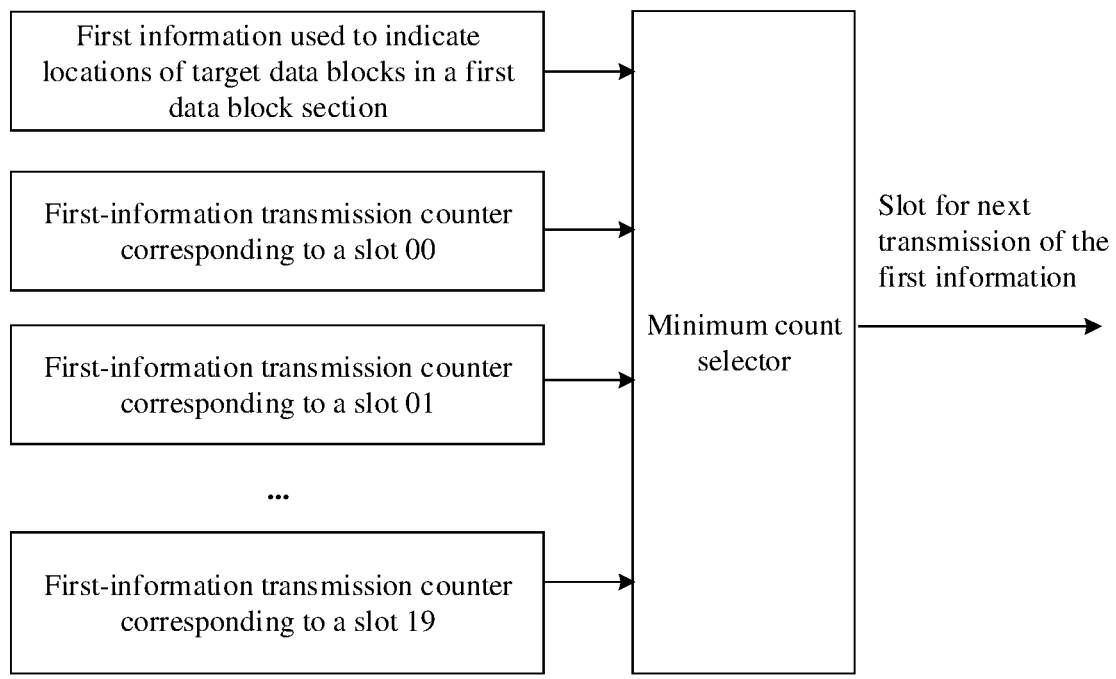
FIG. 6 is a schematic diagram of determining a hybrid multiplexing overhead block according to an embodiment of this application.

If the first information is always transmitted in the first target data block, the first information may always occupy a slot or a target data block corresponding to a relatively small number. As a result, a candidate service that should be transmitted in the slot or the target data block cannot obtain an effective transmission bandwidth, leading to unfairness. In this case, the first communications device may determine a hybrid multiplexing overhead block based on a quantity of times the first information is transmitted in a slot corresponding to each of the target data blocks. For example, the first communications device selects a target data block corresponding to a slot corresponding to a smallest quantity of times the first information is transmitted, to transmit the first information. More specifically, as shown in FIG. 6, first-information transmission counters are set for 20 slots in FlexE. Each time after the first information is sent in a corresponding slot, a counter for the corresponding slot is incremented by 1. In target data blocks identified from 20 consecutive data blocks, a target data block transmitted in a target slot corresponding to a smallest counter value is selected each time to transmit the first information. The target slot is a transmission window for transmitting the first information. Further, a minimum value in counter values corresponding to all slots may alternatively be subtracted from each of the counter values at a boundary of each FlexE overhead frame or multiframe for periodic updating, to prevent overflow. In this way, always occupying a target data block corresponding to a relatively small number can be avoided as much as possible.

A specific process may be as follows.

(1) The first communications device uses 20 data blocks as a group, and identifies target data blocks from the group of data blocks to obtain first information.

(2) The first communications device selects, from slots in which the target data blocks exist, a slot corresponding to a smallest counter value to carry the first information, and increments a counter for the slot by 1. Each time after several groups each including 20 consecutive data blocks, for example, at a boundary of a FlexE overhead multiframe, the first communications device subtracts a minimum value in all counter values from each of the counter values for periodic updating, to prevent overflow.

(3) The second communications device identifies a hybrid multiplexing overhead block from the 20 consecutive data blocks and identifies a location of the hybrid multiplexing overhead block in the 20 consecutive data blocks, extracts the first information, and extracts other target data blocks at locations other than the location of the current hybrid multiplexing overhead code block according to a preset rule.

Figure 7:
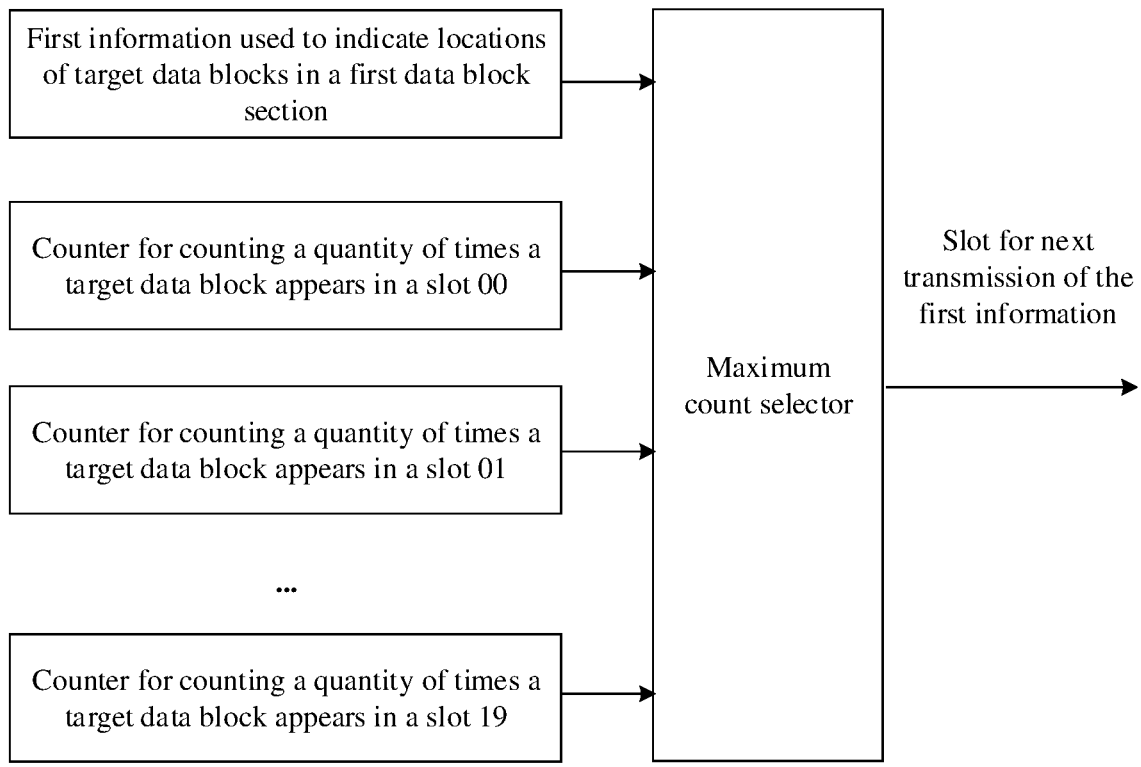
FIG. 7 is a schematic diagram of determining a hybrid multiplexing overhead block according to another embodiment of this application.

The foregoing solution resolves a problem of unfair distribution of the hybrid multiplexing overhead block in all slots. However, whether a target data block appears in each slot is uncertain. Therefore, in another example implementation of this application, as shown in FIG. 7, the first communications device determines a hybrid multiplexing overhead block based on a quantity of times a target data block appears in a slot in which a target data block appears currently. For example, a target data block corresponding to a slot corresponding to a largest quantity of times a target data block appears is selected to transmit first information. To be specific, the first communications device may count a quantity of times a target data block appears in each slot, and transmit the hybrid multiplexing overhead block in the slot corresponding to a largest quantity of times a target data block appears. In this way, idle bandwidths in all the slots can be fairly used to transmit the M candidate services, thereby ensuring fair and effective transmission of the candidate services.

A detailed process is as follows:

(1) The first communications device uses 20 data blocks as a group, and identifies target data blocks from the group of data blocks to obtain first information, and increments a counter for a slot in which a target data block appears by 1. Each time after several groups each including 20 consecutive data blocks, for example, at a boundary of a FlexE overhead multiframe, the first communications device subtracts a minimum value in all counter values from each of the counter values for periodic updating, to prevent overflow.

(2) The first communications device selects, from slots in which the target data blocks exist, a slot corresponding to a largest counter value to carry a hybrid multiplexing overhead block.

(3) The second communications device identifies the hybrid multiplexing overhead block from the 20 consecutive data blocks and identifies a location of the hybrid multiplexing overhead block in the 20 consecutive data blocks, extracts the first information, and extracts other target data blocks at locations other than the location of the current hybrid multiplexing overhead code block according to a preset rule.

Figure 8:
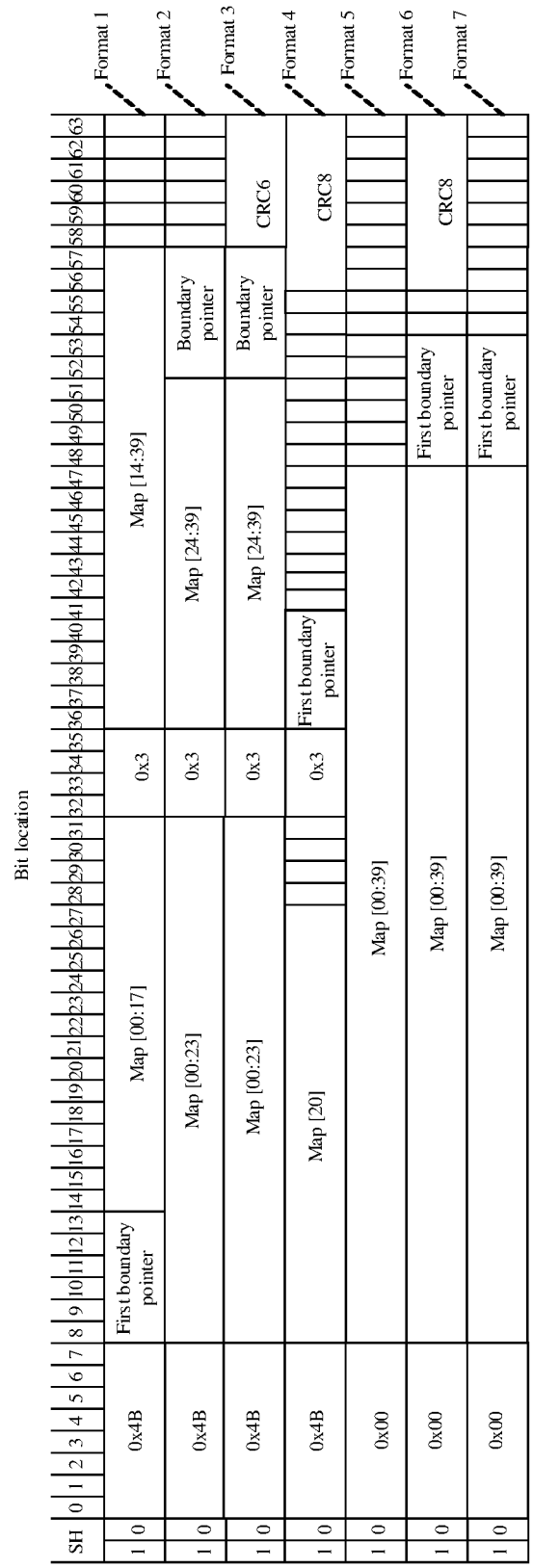
FIG. 8 is a schematic diagram of formats of several hybrid multiplexing overhead blocks according to an embodiment of this application.

FIG. 8 shows formats of several hybrid multiplexing overhead blocks according to an embodiment of this application. In formats 1 to 4, a code block type 0x4B is combined with an O code type 0x3 to uniquely identify a hybrid multiplexing overhead block, to distinguish the hybrid multiplexing overhead block from another data block, so that the second communications device can identify and extract the hybrid multiplexing overhead block. When N is 20 or N is 40, a map may be transmitted in one code block. When a new code block type (for example, 0x00) is used, a maximum value of N may be 56.

In another example, the first communications device may send the first information by using a data stream sent to the second communications device other than the first data stream.

In still another example, the first communications device may send the first information by using an overhead data block in the FlexE overhead multiframe shown in FIG. 4.

The first information is a key for hybrid multiplexing and hybrid demultiplexing on the exclusive services and the candidate services. If the first information in the hybrid multiplexing overhead block is incorrect, not only incorrect extraction is performed on the candidate service, but also TDM demultiplexing on the exclusive services is incorrect. For example, in a transmission process of the first information, if "1" indicates a non-target data block, and "0" indicates a target data block, when a bit "1" in the first information changes to "0", this means that a corresponding non-target data block is identified as a target data block. As a result, a data code block of an exclusive service is considered as a data code block of a candidate service, and data of the candidate service and the exclusive service is incorrectly restored.

Therefore, to improve reliability, a manner of transmitting the first information for a plurality of times is used in this embodiment to reduce a probability that an error occurs in the first information. For example, as shown in FIG. 9, to reduce a probability that an error occurs in the first information during transmission, three of the target data blocks in the first data block section are selected as hybrid multiplexing overhead blocks to transmit three pieces of first information. The second communications device identifies the three hybrid multiplexing overhead blocks. If first information in at least two hybrid multiplexing overhead blocks is the same, the second communications device selects the first information as a basis for hybrid demultiplexing and data stream restoration of the exclusive services.

In addition, when the first communications device and the second communications device have agreed on locations of the target data blocks, the first communications device may not send the first information to the second communications device. For example, when one or more data blocks in the first data block section are reserved for the candidate services, because reservation of the one or more data blocks for the candidate services may be implemented through pre-agreement or pre-configuration, the first communications device may not send the first information to the second communications device.

The first communications device replaces the target data blocks in the first data block section with the data blocks of the M candidate services.

In an example, the first communications device may replace the target data blocks in the first data block section with the data blocks of the M candidate services based on a multiplexing relationship and the first information, where the multiplexing relationship is a correspondence between the M candidate services and locations of data blocks in the first data block section. Optionally, a location of a data block may be a time domain location of the data block. Optionally, a location of a data block may be a relative location of the data block in the first data block section.

For example, each of locations of N data blocks included in the first data block section respectively statically corresponds to one of the M candidate services. In other words, when an ith data block in the first data block section is a target data block, the ith data block may be replaced with a data block of a candidate service corresponding to the ith data block; or when an ith data block is a non-target data block, the ith data block cannot be replaced with a data block of a candidate service corresponding to the ith data block, where i is greater than or equal to 1 and less than or equal to N, and the N data blocks are at least some data blocks in the first data block section.

For another example, the multiplexing relationship may alternatively include only a correspondence between the M candidate services and the locations of the target data blocks in the first data block section. For example, after the target data blocks are detected, the first communications device determines the M candidate services respectively corresponding to the locations of the target data blocks. In this case, the correspondence between the M candidate services and the locations of the target data blocks changes with a quantity and the locations of the target data blocks. In this case, the multiplexing relationship needs to be sent to the second communications device.

It should be understood that, when a quantity of data blocks included in the first data block section is exactly the same as a quantity of time division multiplexing slots obtained through division based on the flexible Ethernet physical interface, the correspondence between the M candidate services and locations of data blocks in the first data block section can also be understood as a correspondence between the M candidate services and the slots.

Actually, in the embodiments of this application, no limitation is set to a case in which the quantity of data blocks included in the first data block section is the same as the quantity of time division multiplexing slots obtained through division based on the flexible Ethernet physical interface. For example, 20 slots are obtained through division based on the flexible Ethernet physical interface, and the quantity of data blocks included in the first data block section may be greater than, equal to, or less than 20.

It should be understood that, the multiplexing relationship may be agreed on by the first communications device and the second communications device without being transmitted (for example, the multiplexing relationship is configured by a network management device or obtained through negotiation between the first communications device and the second communications device). Alternatively, the multiplexing relationship may be sent from the first communications device to the second communications device in a specific manner. A manner of transmitting the multiplexing relationship is not specifically limited in the embodiments of this application.

When the first communications device needs to send the multiplexing relationship to the second communications device, the first communications device may send the multiplexing relationship by using an overhead data block in the first data stream. Optionally, the overhead data block includes a first part and a second part, the first part is used to transmit IDs of the M candidate services, the second part is used to transmit a multiplexing service pointer, and the multiplexing service pointer is used to indicate a candidate service corresponding to a data block in the first data block section.

Figure 10A:
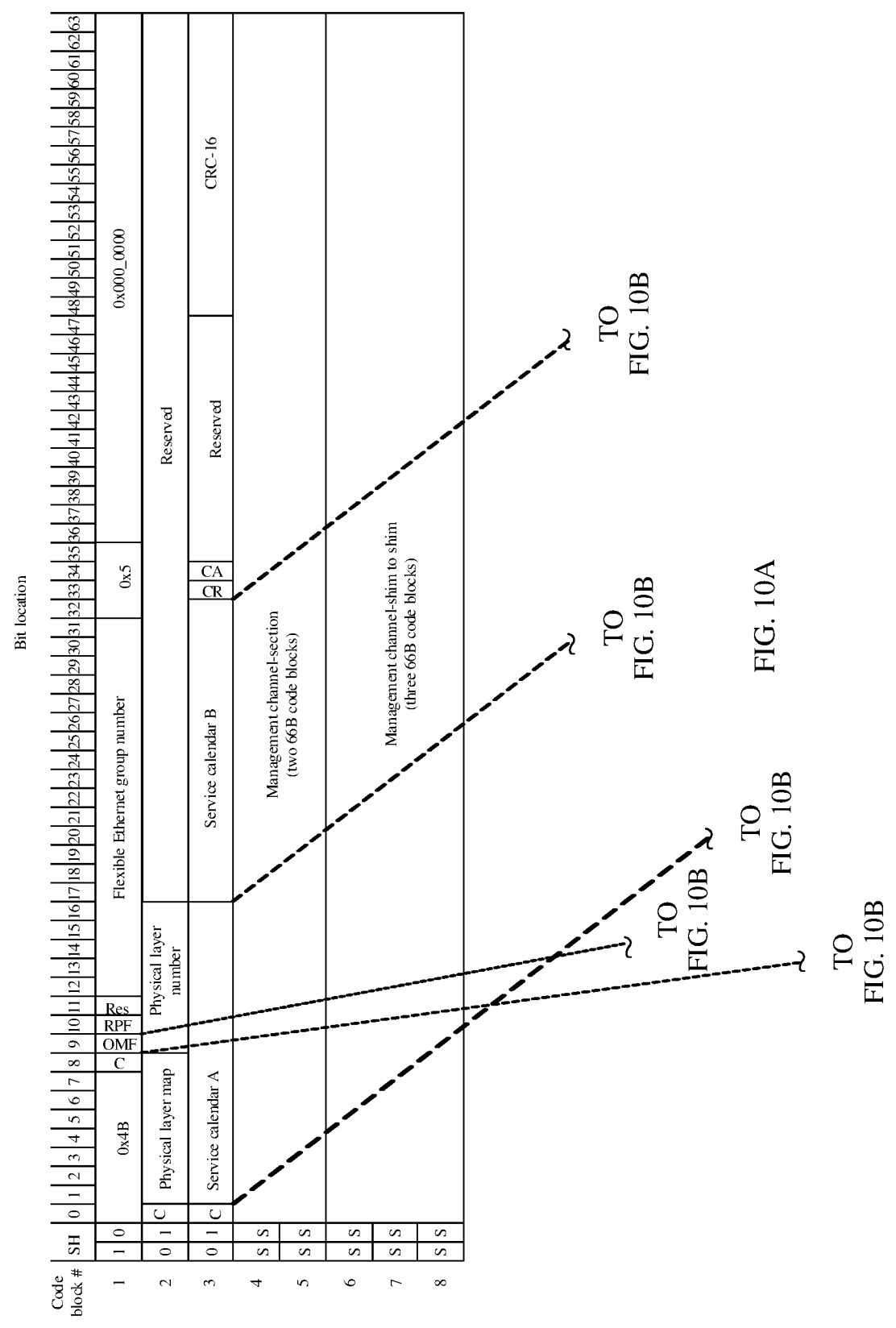

Specifically, as shown in FIG. 10A and FIG. 10B, in a FlexE technology, configuration information (Calendar Configuration) corresponding to 20 slots is transmitted in the first 20 frames in 32 overhead frames in one FlexE overhead multiframe, and the remaining 12 frames are not used. Therefore, the multiplexing relationship may be transmitted in the remaining 12 frames. One party of a service calendar A (or referred to as a flexible Ethernet calendar configuration A (FlexE Calendar Configuration A)) and a service calendar B (or referred to as a flexible Ethernet calendar configuration B (FlexE Calendar Configuration B)) may serve as the other party's standby configuration. To be specific, when the service calendar A is an effective configuration, the service calendar B is a standby configuration; and when the service calendar B is an effective configuration, the service calendar A is a standby configuration. This application is described by using an example in which the service calendar A is an effective configuration and the service calendar B is a standby configuration. It should be understood that, a case in which the service calendar B is an effective configuration and the service calendar A is a standby configuration is similar to the foregoing case.

Example 1

Using M=2 and N=20 as an example, as shown in FIG. 11A, FIG. 11B, and FIG. 11C, frames 21 and 22 are used to transmit specified candidate service identifiers (Hmux client IDs) between a multiplexing device and a demultiplexing device (that is, the first communications device and the second communications device), and frames 23 to 32 are used to specify the foregoing multiplexing relationship. Specifically, a slot i in 20 slots for transmitting the first data block section corresponds to a slot pointer Ptr_Slot_i. A value Ptr_Slot_i=j of the slot pointer indicates that an idle bandwidth in the slot i can be used by a service specified by a jth service ID field in 22 service ID fields. Currently, in FlexE, a maximum of 20 service IDs are supported in configuration information corresponding to 20 slots. Therefore, newly added candidate service IDs may be included in the 20 service IDs or may not be included in the 20 service IDs. In this case, the frames 21 and 22 are added to transmit the IDs of the specified candidate services. In this way, service IDs that can be carried by one overhead multiframe are extended from 20 original service IDs to 22 service IDs.

When the slot pointer uses an 8-bit field length, a value range of Ptr_Slot_i is 0-255, and a definition thereof is listed in Table 1.

TABLE 1

| | |
|---|---|
| Ptr_Slot_i = 0 | Hybrid multiplexing is not performed in the slot i, and there is no corresponding candidate service ID. |
| Ptr_Slot_i = 1-22 | 1-20 represent the first 20 service ID fields in 22 service ID fields in a FlexE overhead multiframe. For each of 20 services, there is at least an assured bandwidth of 5 Gbps, and the 20 services are multiplexed in at least one slot, or in other words, a reclaimed bandwidth is released in the slot i. 21 and 22 represent candidate service ID fields. When the specified candidate service IDs are not provided in the current 20 ID fields, the two additional service ID fields need to support at least two candidate service IDs. In this case, a reclaimed bandwidth released in the slot i belongs |

TABLE 1-continued

| | |
|---|---|
| Ptr_Slot_i = 23-255 | to a service indicated by a candidate service ID specified by Ptr_Slot_i. Reservation. |

For Table 1, for example, Ptr_Slot_1=4 indicates that after an idle bandwidth in a slot 1 is reclaimed, the idle bandwidth is to be used by a service indicated by the 4th service ID field in the 22 service ID fields in the FlexE overhead multiframe; Ptr_Slot_1=20 indicates that after the idle bandwidth in the slot 1 is reclaimed, the idle bandwidth is to be used by a service indicated by the 20th service ID field in the 22 service ID fields in the FlexE overhead multiframe; and Ptr_Slot_1=22 indicates that after the idle bandwidth in the slot 1 is reclaimed, the idle bandwidth is to be used by a service indicated by the 22nd service ID field in the 22 service ID fields in the FlexE overhead multiframe, that is, a candidate service 2 (Hmux Client 2).

To reduce the bit field length of the slot pointer, only the 21st and 22nd candidate service ID fields may alternatively be indicated. For example, the slot pointer uses a 2-bit field length; Ptr_Slot_i=0 indicates that no candidate service is configured in the slot i; Ptr_Slot_i=1 indicates that after an idle bandwidth in the slot i is reclaimed, the idle bandwidth is to be used by a service indicated by the 21st service ID field in the 22 service ID fields in the FlexE overhead multiframe; Ptr_Slot_i=2 indicates that after an idle bandwidth in the slot i is reclaimed, the idle bandwidth is to be used by the service indicated by the 22nd service ID field in the 22 service ID fields in the FlexE overhead multiframe; and Ptr_Slot_i=3 indicates "reserved".

It should be understood that, the bit field length used by the slot pointer may be configured based on an actual case.

Figure 12:
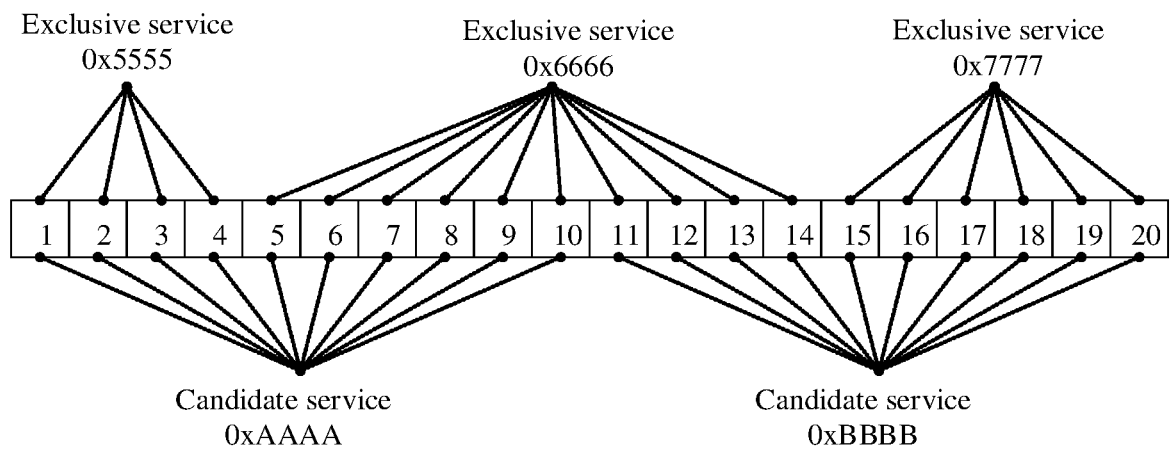
FIG. 12 is a schematic diagram of a multiplexing relationship according to an embodiment of this application.

The following uses a specific example to describe a process of performing hybrid multiplexing on exclusive services and candidate services when M is 2 and N is 20. As shown in FIG. 12 and FIG. 13, for a 100 Gbps FlexE data frame structure, three exclusive services and two candidate services are defined in this embodiment. The exclusive service has a higher priority, and the candidate service has a lower priority. The three exclusive services are respectively numbered 0x5555, 0x6666, and 0x7777. FlexE time division multiplexing slots 0 to 3 are allocated to the service 0x5555, and a bandwidth occupied by the service 0x5555 is 20 Gbps. FlexE time division multiplexing slots 4 to 13 are allocated to the service 0x6666, and a bandwidth occupied by the service 0x6666 is 50 Gbps. FlexE time division multiplexing slots 14 to 19 are allocated to the service 0x7777, and a bandwidth occupied by the service 0x7777 is 30 Gbps. A total of 20 slots are allocated to the three higher-priority exclusive services, and a total bandwidth occupied by the three higher-priority exclusive services is 100 Gbps. The two candidate services are respectively numbered 0xAAAA and 0xBBBB, and no exclusive FlexE slots are allocated to the two candidate services. Slots 0 to 9 are specified for the service 0xAAAA. When target data blocks of the exclusive services are transmitted in these slots, these target data blocks may be replaced with data blocks of the service 0xAAAA to transmit service data of the service 0xAAAA. Similarly, slots 10 to 19 are specified for the service 0xBBBB. When target data blocks of the exclusive services are transmitted in these slots, these target data blocks may be replaced with data blocks of the service 0xBBBB to transmit service data of the service 0xBBBB. It can be understood that a correspondence between candidate services and slots may be another correspondence. For example, it may be specified that the service 0xAAAA can use idle bandwidths in slots 0, 2, 4, 6, 8, 10, 12, 14, 16, and 18 and that the service 0xBBBB can use idle bandwidths in slots 1, 3, 5, 7, 9, 11, 13, 15, 17, and 19.

The correspondence between candidate services and slots may be agreed upon by the first communications device and the second communications device without being transmitted, or may be sent by the first communications device to the second communications device in a specific manner.

FIG. 13 shows a manner of transmitting the foregoing correspondence by using a FlexE overhead multiframe (or referred to as overhead data blocks in a first data stream). As shown in FIG. 13, during transmission of the foregoing correspondence in a service calendar A or a service calendar B, 0xAAAA is filled in a candidate service ID 1 (which is a service ID field numbered 21 from top to bottom and is correspondingly transmitted in an overhead frame 21 in the FlexE overhead multiframe), and 0xBBBB is filled in a candidate service ID 2 (which is a service ID field numbered 22 from top to bottom and is correspondingly transmitted in an overhead frame 22 in the FlexE overhead multiframe). Slot pointers are indicated and transmitted in overhead frames 23 to 32 in the FlexE overhead multiframe (transmitted in two columns in FIG. 13). As shown in FIG. 13, the first 10 slots (or referred to as the first 10 transmission windows in transmission windows of 20 consecutive data blocks) are allocated to a service 0xAAAA corresponding to the candidate service ID 1, values of pointers of the slots are 21 and hexadecimal numbers of the values are 0x15; and slots 11 to 19 are allocated to a service 0xBBBB corresponding to the candidate service ID 2, values of pointers of the slots are 22, and hexadecimal numbers of the values are 0x16.

Example 2

M=2 and N=20 are still used as an example. Different from Example 1, in Example 2, an exclusive slot is allocated to the candidate service 0xAAAA, and a minimum assured bandwidth corresponding to one slot is provided for the candidate service 0xAAAA. In other words, in addition to a null type of data block, target data blocks include a preset type of data block, and the preset type indicates that the data block is not reserved for the candidate service 0xAAAA. In a time division multiplexing process, an exclusive service does not occupy the data block or a transmission window of the data block.

Three exclusive services and two candidate services are defined in this embodiment. The three exclusive services are respectively numbered 0x5555, 0x6666, and 0x7777. FlexE time division multiplexing slots 0 to 3 are allocated to the service 0x5555, and a bandwidth occupied by the service 0x5555 is 20 Gbps. FlexE time division multiplexing slots 4 to 13 are allocated to the service 0x6666, and a bandwidth occupied by the service 0x6666 is 50 Gbps. FlexE time division multiplexing slots 14 to 18 are allocated to the service 0x7777, and a bandwidth occupied by the service 0x7777 is 25 Gbps. A total of 19 slots are allocated to the three higher-priority exclusive services, and a total bandwidth occupied by the three higher-priority exclusive services is 95 Gbps. The two candidate services are respectively numbered 0xAAAA and 0xBBBB. An exclusive FlexE slot 19 is allocated to the service 0xAAAA, or in other words, a minimum assured bandwidth of 5 Gbps is provided for the service 0xAAAA; and multiplexing slots 0 to 9 are also specified for the service 0xAAAA. Slots 10 to 19 are specified for the service 0xBBBB, but no exclusive slot is allocated to the service 0xBBBB.

FIG. 14 shows a manner of transmitting the foregoing correspondence by using a FlexE overhead multiframe (or referred to as overhead data blocks in a first data stream). As shown in FIG. 14, during transmission of the foregoing correspondence in a service calendar A or a service calendar B, 0xAAAA is filled in a service ID carried in a slot 19 (which is a service ID field numbered 20 from top to bottom and is correspondingly transmitted in an overhead frame 20 in the FlexE overhead multiframe), 0xAAAA is filled in a candidate service ID 1 (which is a service ID field numbered 21 from top to bottom and is correspondingly transmitted in an overhead frame 21 in the FlexE overhead multiframe), and 0xBBBB is filled in a candidate service ID 2 (which is a service ID field numbered 22 from top to bottom and is correspondingly transmitted in an overhead frame 22 in the FlexE overhead multiframe). Slot pointers are indicated and transmitted in overhead frames 23 to 32 in the FlexE overhead multiframe (transmitted in two columns in FIG. 14). As shown in FIG. 14, the first 20 slots (or referred to as the first 10 transmission windows in transmission windows of 20 consecutive data blocks) are allocated to a service 0xAAAA corresponding to the candidate service ID 1, values of pointers of the slots are 21 and hexadecimal numbers of the values are 0x15; and slots 11 to 18 are allocated to a service 0xBBBB corresponding to the candidate service ID 2, values of pointers of the slots are 22, and hexadecimal numbers of the values are 0x16. In this way, the candidate service 0xAAAA can reuse idle bandwidths in code block transmission windows corresponding to slots 0 to 9 and exclusively use a bandwidth in a code block transmission window corresponding to the slot 19; and the candidate service 0xBBBB can reuse idle bandwidths in code block transmission windows corresponding to slots 10 to 18.

It should be noted that, a value of a slot pointer of the slot 19 is 0. Referring to Table 1, the value indicates that hybrid multiplexing is not performed in the slot 19 and there is no corresponding candidate service ID.

Example 3

In Example 1 and Example 2, slot pointers point to only service ID fields in which candidate service IDs are located. In this embodiment, slot pointers may point to all service ID fields. In other words, the slot pointers may point to ID fields in which exclusive service IDs are located and service ID fields in which candidate service IDs are located.

Using M=3 and N=20 as an example, three exclusive services and three candidate services are defined in this embodiment. The three exclusive services are respectively numbered 0x5555, 0x6666, and 0x7777. FlexE time division multiplexing slots 0 to 3 are allocated to the service 0x5555, and a bandwidth occupied by the service 0x5555 is 20 Gbps. FlexE time division multiplexing slots 4 to 13 are allocated to the service 0x6666, and a bandwidth occupied by the service 0x6666 is 50 Gbps. FlexE time division multiplexing slots 14 to 18 are allocated to the service 0x7777, and a bandwidth occupied by the service 0x7777 is 25 Gbps. A total of 19 slots are allocated to the three higher-priority exclusive services, and a total bandwidth occupied by the three higher-priority exclusive services is 95 Gbps. The three candidate services are respectively numbered 0xAAAA, 0xBBBB, and 0xCCCC. An exclusive FlexE slot 19 is allocated to the service 0xAAAA, or in other words, a minimum assured bandwidth of 5 Gbps is provided for the service 0xAAAA; and multiplexing slots 0 to 9 are also specified for the service 0xAAAA. Slots 10 to 16 are specified for the service 0xBBBB, but no exclusive slot is allocated to the service 0xBBBB. Slots 17 and 18 are specified for the service 0xCCCC, but no exclusive slot is allocated to the service 0xCCCC either.

FIG. 15 shows a manner of transmitting the foregoing correspondence by using a FlexE overhead multiframe (or referred to as overhead data blocks in a first data stream). As shown in FIG. 15, during transmission of the foregoing correspondence in a service calendar A or a service calendar B, 0xAAAA is filled in a service ID carried in a slot 19 (which is a service ID field numbered 20 from top to bottom and is correspondingly transmitted in an overhead frame 20 in the FlexE overhead multiframe), 0xBBBB is filled in a candidate service ID 1 (which is a service ID field numbered 21 from top to bottom and is correspondingly transmitted in an overhead frame 21 in the FlexE overhead multiframe), and 0xCCCC is filled in a candidate service ID 2 (which is a service ID field numbered 22 from top to bottom and is correspondingly transmitted in an overhead frame 22 in the FlexE overhead multiframe). Slot pointers are indicated and transmitted in overhead frames 23 to 32 in the FlexE overhead multiframe (transmitted in two columns in FIG. 15). As shown in FIG. 15, the first 20 slots (or referred to as the first 10 transmission windows in transmission windows of 20 consecutive data blocks) are allocated to a service 0xAAAA corresponding to the candidate service ID, values of pointers of the slots are 20, and hexadecimal numbers of the values are 0x14; slots 10 to 16 are allocated to a service 0xBBBB corresponding to the candidate service ID 1, values of pointers of the slots are 21, and hexadecimal numbers of the values are 0x15; and slots 17 and 18 are allocated to a service 0xCCCC corresponding to the candidate service ID 2, values of pointers of the slots are 22, and hexadecimal numbers of the values are 0x16. In this way, because the service ID originally defined in the overhead multiframe can be used, a quantity of candidate services is no longer limited by a quantity of newly added candidate service IDs. Therefore, hybrid multiplexing on more candidate services and exclusive services can be supported. As shown in FIG. 15, hybrid multiplexing on a maximum of 20 (because there are only 20 slots in FIG. 15) candidate services and 20 exclusive services can be supported.

In other words, the exclusive services may be further used as candidate services, and data blocks thereof are used to replace target data blocks in the first data block section, thereby improving network utilization. In other words, IDs of at least some of the M candidate services are the same as IDs of P exclusive services that form the first data block section, where P is a positive integer.

Example 4

Because a manner of using an original service ID field in the FlexE overhead multiframe in Example 3 is changed, impact may be caused to existing implementation during implementation of the solution, and a potential risk may exist. In Example 4, another manner is provided. This manner does not affect use of the original service ID field in the FlexE overhead multiframe, independently depends on a reserved field in the FlexE overhead multiframe to transmit the foregoing correspondence, and can support hybrid multiplexing on more candidate services and exclusive services.

FIG. 16 shows a manner of transmitting the foregoing correspondence by using a FlexE overhead multiframe (or referred to as overhead data blocks in a first data stream). As shown in FIG. 16, in this embodiment, candidate service ID fields are extended to five candidate service ID fields, and the five candidate service ID fields occupy overhead frames 21 to 25 in the FlexE overhead multiframe; and overhead frames 26 to 32 are used to transmit slot pointers, that is, a correspondence between the M candidate services and target data blocks.

Because the slot pointers are transmitted only in the seven overhead frames: the overhead frames 26 to 32, a field length of each slot pointer is reduced. As listed in Table 2, a field length of Ptr_Slot_i is 5 bits, and a value range of Ptr_Slot_i is 0 to 31. A definition of Ptr_Slot_i is listed in Table 2. It can be learned that, because the value range of the slot pointer is 0 to 31, the slot pointers in Example 4 may point to all service ID fields, that is, may point to ID fields in which exclusive service IDs are located and service ID fields in which candidate service IDs are located.

TABLE 2

| | |
|---|---|
| Ptr_Slot_i = 0 | Hybrid multiplexing is not performed in the slot i, and there is no corresponding candidate service ID. |
| Ptr_Slot_i = 1-25 | 1 to 20 represent exclusive service IDs corresponding to FlexE slots, and 21 to 25 represent candidate service IDs. |
| Ptr_Slot_i = 26-31 | Reservation. |

Example 5

Figure 17B:
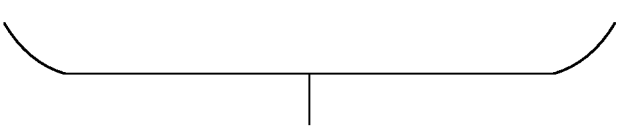

Similar to Example 4, in Example 5, candidate service ID fields are extended to seven candidate service ID fields. FIG. 17A and FIG. 17B show a manner of transmitting the foregoing correspondence by using a FlexE overhead multiframe (or referred to as overhead data blocks in a first data stream). As shown in FIG. 17A and FIG. 17B, the candidate service ID fields occupy overhead frames 21 to 27 in the FlexE overhead multiframe, and overhead frames 28 to 32 are used to transmit slot pointers. A field length of each slot pointer is further reduced. As listed in Table 3, a field length of Ptr_Slot_i is 4 bits, and a value range of Ptr_Slot_i is 0 to 15. A definition of Ptr_Slot_i is listed in Table 3. It can be learned that, because the value range of the slot pointer is 0 to 15, the slot pointers in Example 5 point to only service ID fields in which candidate service IDs are located. Certainly, the slot pointers may alternatively point to service ID fields in which candidate service IDs are located and some exclusive service ID fields.

TABLE 3

| | |
|---|---|
| Ptr_Slot_i = 0 | Hybrid multiplexing is not performed in the slot i, and there is no corresponding candidate service ID. |
| Ptr_Slot_i = 1-7 | 1 to 7 represent candidate service IDs. |
| Ptr_Slot_i = 8-15 | Reservation. |

It should be understood that, the foregoing uses an example in which 20 slots are obtained through division based on a 100G physical interface and N is 20. In other words, there is a periodic correspondence between slots and data blocks. Therefore, a multiplexing service pointer may be implemented in a form of a slot pointer. When a quantity of slots obtained through division is unequal to N (that is, a quantity of data blocks in the first data block section), it is inconvenient to implement the multiplexing service pointer in a form of a slot pointer. Optionally, a sequence number of a data block in the first data block section or a number of a service ID field corresponding to a data block in the first data block section may be directly filled in a corresponding field.

The solution in the embodiments of this application is described in detail below with reference to Example 1, FIG. 18, Example 2, and FIG. 19.

Figure 18:
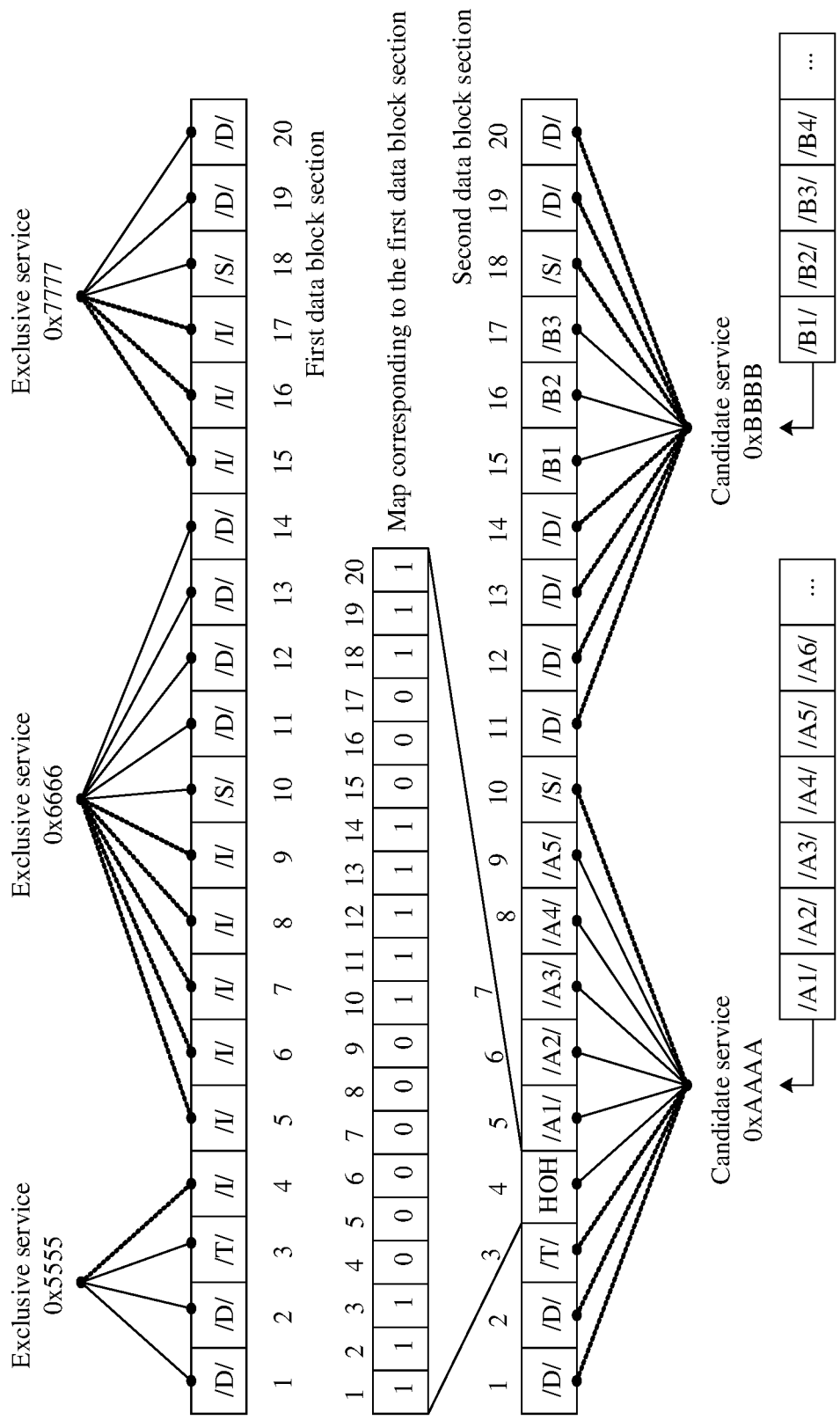
FIG. 18 shows an example of replacing target data blocks with data blocks of candidate services according to an embodiment of this application.

FIG. 18 shows an example of replacing target data blocks with data blocks of candidate services according to an embodiment of this application. A multiplexing relationship is shown in FIG. 13. A first communications device replaces target data blocks in a first data block section with data blocks of the service 0xAAAA and the service 0xBBBB based on a map and the multiplexing relationship.

As shown in FIG. 18, based on a configuration in the FlexE overhead multiframe in FIG. 13, in the 20 consecutive data blocks, in addition to a target data block required for transmitting the map, the candidate service 0xAAAA may use other idle bandwidths in the slots 0 to 9, that is, target data blocks in the slots 0 to 9 may be replaced with data blocks of the service 0xAAAA; and the candidate service 0xBBBB may use other idle bandwidths in the slots 10 to 19, that is, target data blocks in the slots 10 to 19 may be replaced with data blocks of the service 0xBBBB, to complete hybrid multiplexing on the candidate services.

Specifically, code block type distribution of 20 consecutive data blocks obtained after TDM multiplexing is performed on three exclusive services is shown in FIG. 18. Data blocks 4 to 9 and 15 to 17 are target data blocks, that is, data blocks in which no effective service information is transmitted and that can be replaced. Overall distribution of the target data blocks in the first data block section may be represented by using a map, for example, by using a bit sequence "11100000011111000111", where the values 0 represent the data blocks 4 to 9 and 15 to 17. To enable a second communications device to restore the first data block section, at least one of the target data blocks 4 to 9 and 15 to 17 needs to be used as a hybrid multiplexing overhead block for carrying the map. In FIG. 18, the data block 4 is used to carry the map corresponding to the first data block section. The data block 4 may be of a specific code block type and/or an O code type. The data block 4 is used to transmit the map, the data blocks 5 to 9 may be used to transmit data blocks A1 to A5 of the candidate service 0xAAAA, and the data blocks 15 to 17 may be used to transmit data blocks B1 to B3 of the candidate service 0xBBBB. Accordingly, the first communications device replaces the target data blocks in the first data block section with the hybrid multiplexing overhead block and the data blocks of the candidate services 0xAAAA and 0xBBBB, to complete a process of hybrid multiplexing on the candidate services and the exclusive services. The second communications device searches a second data block section for the data block 4 to extract the map from the data block 4. In this way, the second communications device can extract the data blocks of the candidate services based on the received map and a preset rule, and restore the first data block section.

In this way, the second data block section obtained after the process of hybrid multiplexing on the candidate services and the exclusive services is performed may include the hybrid multiplexing overhead block, data blocks of the exclusive services, and the data blocks of the candidate services.

Figure 19:
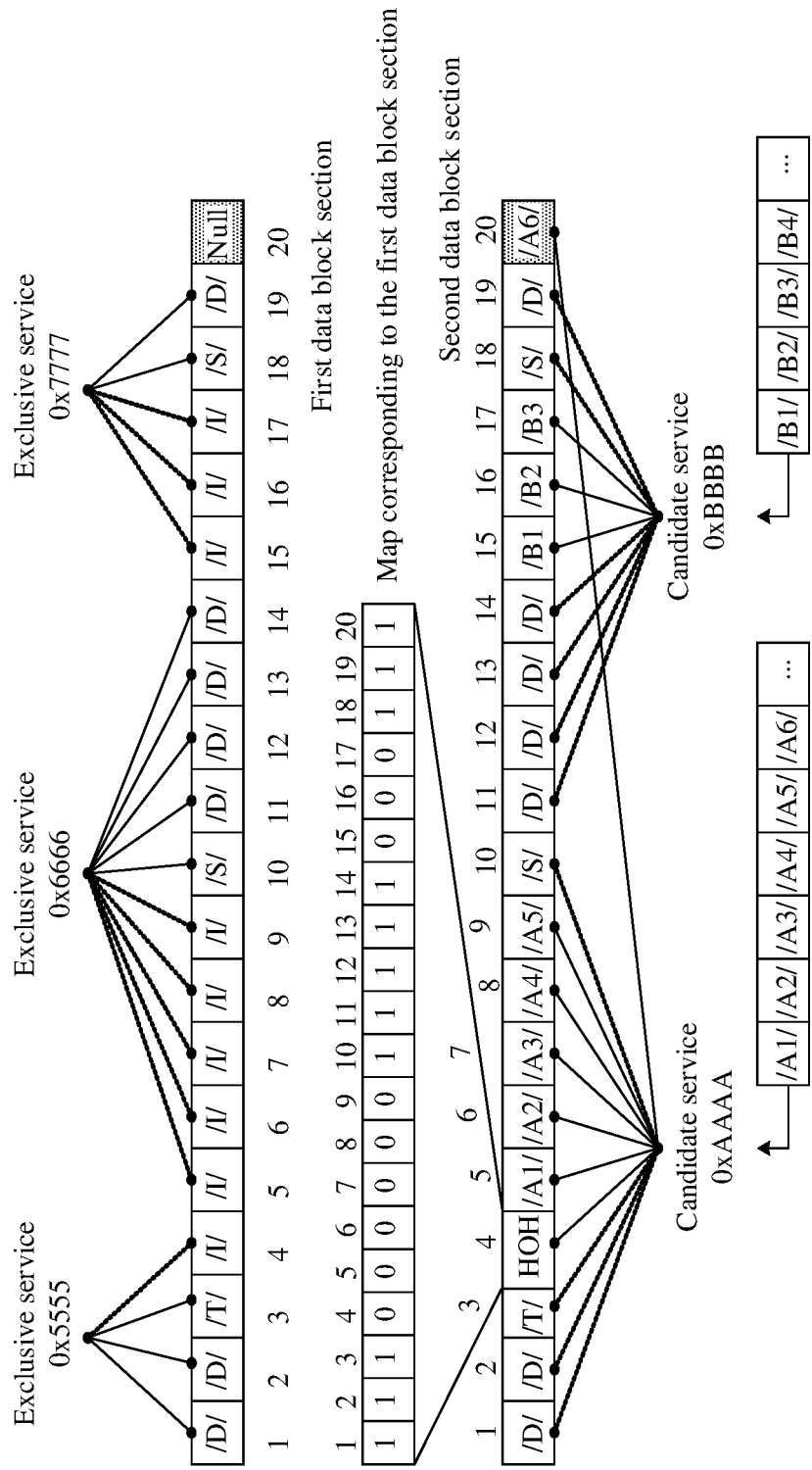
FIG. 19 shows another example of replacing target data blocks with data blocks of candidate services according to an embodiment of this application.

FIG. 19 shows another example of replacing target data blocks with data blocks of candidate services according to an embodiment of this application. A multiplexing relationship is shown in FIG. 14. A first communications device replaces target data blocks in a first data block section with data blocks of the service 0xAAAA and the service 0xBBBB based on a map and the multiplexing relationship.

As shown in FIG. 19, based on a configuration in the FlexE overhead multiframe in FIG. 14, in the 20 consecutive data blocks, in addition to a target data block required for transmitting the map, the candidate service 0xAAAA may use other idle bandwidths in the slots 0 to 9 and exclusively use a bandwidth resource in the slot 19, that is, target data blocks in the slots 0 to 9 and the slot 19 may be replaced with data blocks of the service 0xAAAA; and the candidate service 0xBBBB may use other idle bandwidths in the slots 10 to 18, that is, target data blocks in the slots 10 to 18 may be replaced with data blocks of the service 0xBBBB, to complete hybrid multiplexing on the candidate services.

A replacement process shown in FIG. 19 is similar to that in the method shown in FIG. 18. It should be noted that, in FIG. 19, data blocks 4 to 9, 15 to 17, and 20 are target data blocks, transmission windows 5 to 9 and 20 may be used to transmit data blocks A1 to A6 of the candidate service 0xAAAA, and the transmission windows 15 to 17 may be used to transmit data blocks B1 to B3 of the candidate service 0xBBBB.

Manners of replacing target data blocks with data blocks of candidate services in Example 3 to Example 5 are similar to those in Example 1 and Example 2.

In another example, due to uncertainty of an idle bandwidth resource and uncertainty of insertion of a hybrid multiplexing overhead code block, fair transmission of candidate services may not be ensured in a scenario in which fairness needs to be emphasized. Therefore, this embodiment provides another manner of performing hybrid multiplexing on candidate services and exclusive services, to satisfy a requirement of a scenario in which fairness needs to be emphasized. Specifically, in this embodiment, there is no fixed correspondence between locations of data blocks or target data blocks in a first data block section and candidate services any longer. Therefore, the target data blocks are replaced with data blocks of the M candidate services in a preset sequence.

Specifically, the first communications device may replace the target data blocks in the first data block section with the data blocks of the M candidate services in the preset sequence based on first information. The preset sequence is an arrangement sequence of the M first services during replacement of the target data blocks with the data blocks of the M first services. The preset sequence may be determined based on ID values, priorities, data volumes, and the like of the candidate services.

Optionally, the preset sequence is a polling sequence. For example, M=4 first services are respectively A, B, C, and D, and a polling sequence may be A, B, C, D, A, B, C, D, A . . . , or may be D, C, B, A, D, C, B, A, D . . . , or may be A, A, B, C, D, A, A, B, C, D, A, A . . . . Further, the polling sequence may be a weighted polling sequence. The weighted polling sequence may be understood as follows: The M first services have different weights. A larger weight of a first service indicates that the first service occupies more data blocks in a polling process, and a smaller weight of a first service indicates that the first service occupies fewer data blocks in a polling process. For example, M=4 first services are respectively A, B, C, and D, and a weighted polling sequence may be A, A, B, C, D, A, A, B, C, D, A, A, . . . . The preset sequence is not specifically limited in the embodiments of this application, and may be any arrangement sequence that can be implemented.

In this case, the first communications device may send second information to a second communications device. The second information is used to indicate a location, in the first data block section, of the first target data block used to carry the first candidate service in the M candidate services.

Based on the arrangement sequence of the M candidate services and the second information, the receive end device can determine the candidate services to be transmitted after the target data blocks are replaced. Therefore, a correspondence between locations of target data blocks and candidate services does not need to be transmitted in real time, and only a location at which the receive end device starts to perform polling for the first time needs to be indicated by using a smaller overhead. This can reduce overheads and improve network utilization.

Example 6

In this embodiment, target data blocks (or referred to as idle bandwidths) in a first data block section are periodically divided into n data blocks. In other words, the target data blocks are grouped into several data block sets by using n data blocks as a unit, where n is greater than or equal to M. M candidate services use the n data blocks in a preset sequence, where n is a static parameter, and n may be determined through negotiation between a first communications device and a second communications device, or may be fixedly configured, and does not rely on transmission. Alternatively, n may be transmitted from the first communications device to the second communications device, for example, transmitted by using a FlexE overhead multiframe or a hybrid multiplexing overhead block or transmitted in another manner. In this way, uncertainty of the M candidate services and bandwidth resources can be decoupled to implement fair transmission of the candidate services.

When n=k*M, for a data block set, each candidate service may occupy k data blocks in n data blocks in the data block set. The following uses k=1 as an example to describe in detail a specific process in this embodiment with reference to FIG. 20 and FIG. 21.

Figure 20:
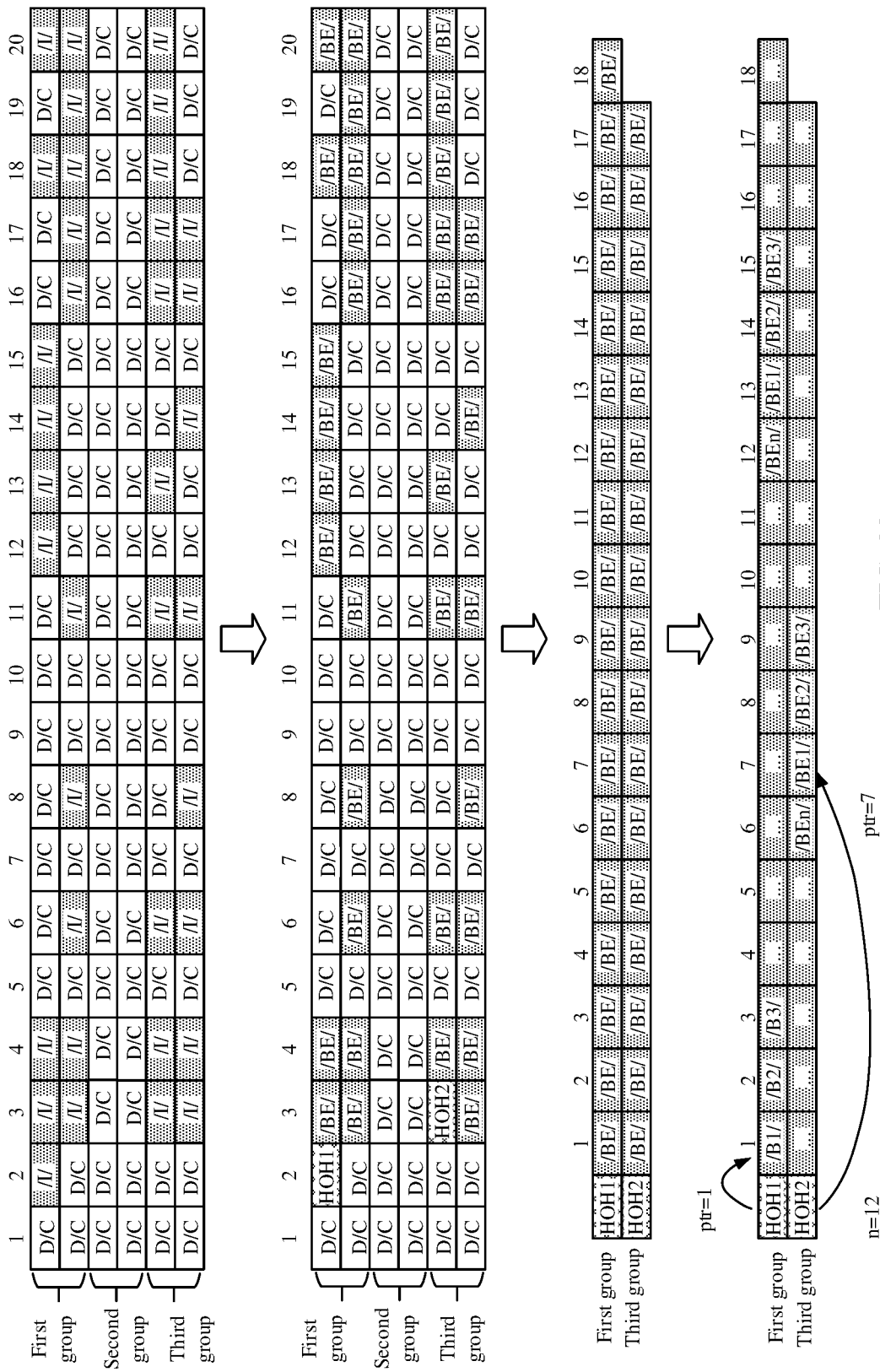
FIG. 20 shows another example of replacing target data blocks with data blocks of candidate services according to an embodiment of this application.

(1) Select N=40 data blocks as one group (that is, the first data block section includes 40 data blocks), identify target data blocks in the 40 consecutive data blocks, and create a map. Because one FlexE overhead frame corresponds to 20*1023*8 payload data blocks, the FlexE overhead frame may be divided into 1023*4 groups each including 40 consecutive data blocks. FIG. 20 shows three groups each including 40 consecutive data blocks, that is, a total of 120 data blocks. There are 19 target data blocks in a first group, there is no target data block in a second group, and there are 18 target data blocks in a third group.

(2) In the first group of data blocks, the second data block in which the first target data block is located is used as a hybrid multiplexing overhead block to transmit the map, and in this case, the 18 target data blocks following the hybrid multiplexing overhead block and the hybrid multiplexing overhead block are used as a row. In the second group of data blocks, there is no target data block, and therefore hybrid multiplexing is not performed, that is, no candidate service is transmitted. In the third group of data blocks, the third data block in which the first target data block is located is used as a hybrid multiplexing overhead block to transmit the map, and in this case, the 17 target data blocks following the hybrid multiplexing overhead block and the hybrid multiplexing overhead block are used as a row.

(3) Target data blocks remaining after the hybrid multiplexing overhead blocks are removed from the 37 target data blocks are periodically divided into n data blocks. In FIG. 20, n=12 is used as an example. A maximum of M=n=12 candidate services are supported. The hybrid multiplexing overhead block in the first group of data block may include second information used to indicate a start location of the first data block set. For example, the second information is a boundary pointer of the first data block set (1st Boundary Ptr). In this way, idle bandwidth resources reclaimed on a physical interface are divided into n=12 equal parts.

In the present disclosure, a boundary of the first complete data block set is indicated by using a first boundary pointer, and a boundary of a data block set following the first data block set may be determined through calculation based on a map in the hybrid multiplexing overhead code block.

When the boundary pointer is carried in the hybrid multiplexing overhead block, to indicate the boundary of the first complete data block set corresponding to target data blocks managed by the hybrid multiplexing overhead block, the hybrid multiplexing overhead block may use a 6-bit first boundary pointer indication bit. A specific case is shown in FIG. 8. In FIG. 8, if a 6-bit first boundary pointer is used, the first data block section includes a maximum of 50 data blocks. When cyclic redundancy check (CRC) needs to be further introduced to perform integrity check on the map and the boundary pointer, a quantity of data blocks included in the first data block section may need to be further reduced.

Optionally, the boundary pointer of the data block set may be sent to the second communications device in another manner. This is not limited in the embodiments of this application.

Figure 21:
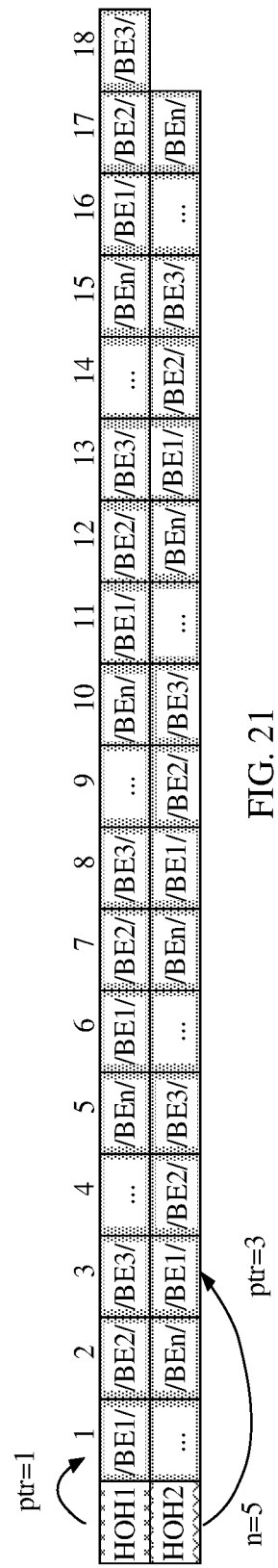
FIG. 21 is a schematic diagram of grouping of target data blocks when n is 5.

Alternatively, when n is 5, as shown in FIG. 21, a boundary pointer carried in a hybrid multiplexing overhead block 1 points to the first target data block, and a boundary pointer carried in a hybrid multiplexing overhead block 2 points to the third target data block.

(4) Using n=12 as an example, 12 data blocks in each data block set may be replaced with data blocks of the M candidate services according to a specific rule. In other words, if M=n=12, each candidate service occupies one of the 12 data blocks to replace the target data blocks with the data blocks of the candidate services.

When to-be-transmitted candidate services are not determined in advance through negotiation between the first communications device and the second communications device, candidate service IDs may also be transmitted by using reserved fields in the FlexE overhead multiframe in Example 6. As shown in FIG. 22, candidate service IDs may be transmitted in overhead frames 21 to 32 in a FlexE overhead multiframe, or in other words, a total of 12 candidate service IDs may be transmitted.

In this way, the idle bandwidths are periodically divided into n data blocks, so that uncertainty of the candidate services and the bandwidth resources can be decoupled, thereby ensuring fairness of hybrid multiplexing.

Example 7

Figure 23:
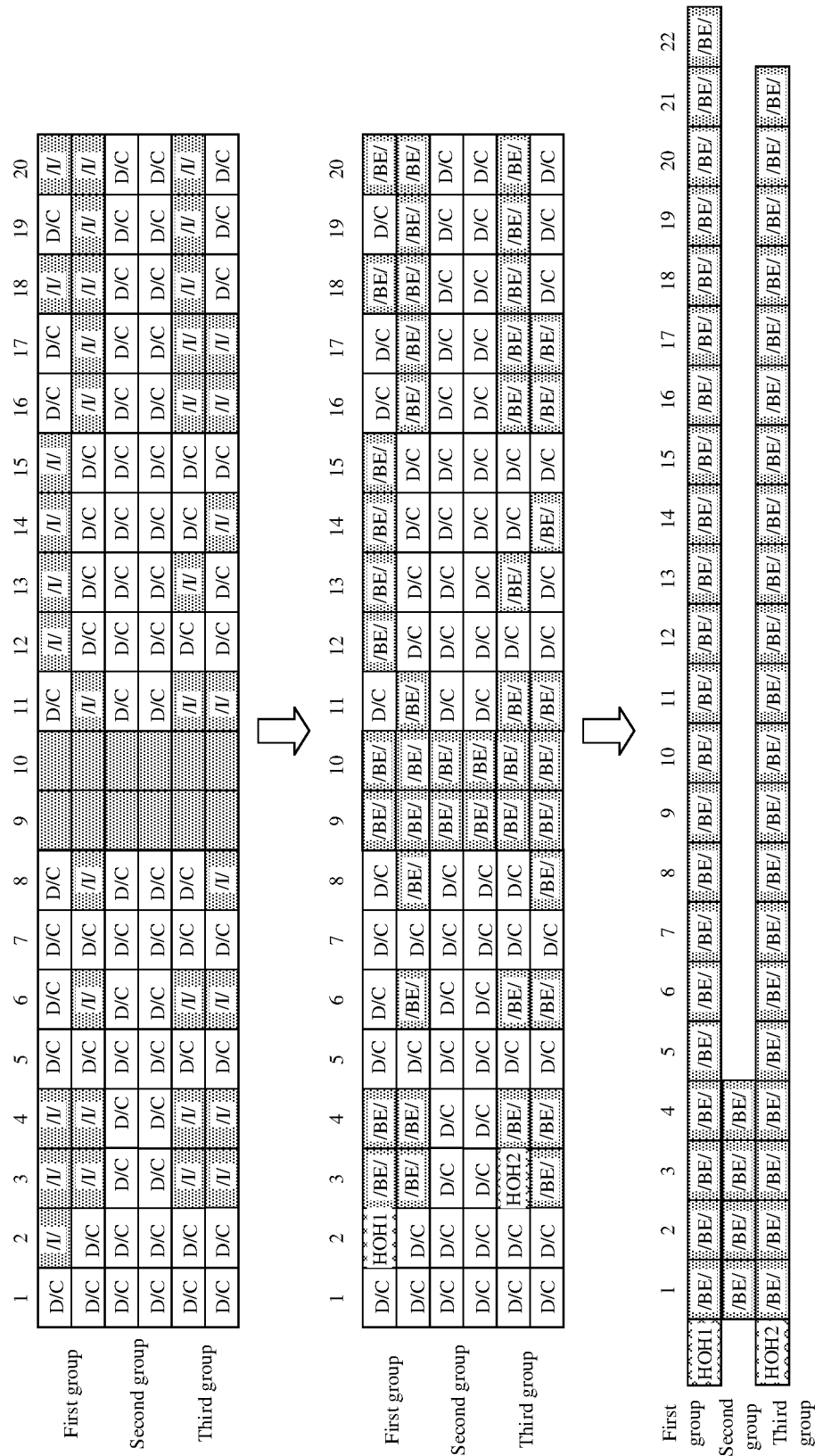
FIG. 23 shows another example of replacing target data blocks with data blocks of candidate services according to an embodiment of this application.

Based on Example 6, a minimum assured bandwidth is provided for a candidate service, or in other words, the candidate service occupies a baseline bandwidth. As shown in FIG. 23, for example, baseline bandwidths occupied by candidate services are bandwidths corresponding to slots 9 and 10. In this case, slots 8 and 9 are reserved for the candidate service. Data blocks 9 and 10 are combined with other target data blocks, and the idle bandwidths are periodically divided into n data blocks. A hybrid multiplexing overhead block is used to carry a first boundary pointer. Similar to Example 2, in Example 7, code block transmission windows corresponding to the slots 8 and 9 are preconfigured to be reserved for the candidate service. To be specific, in corresponding code block transmission windows, there are no effective code blocks in a first data block section obtained after TDM multiplexing is performed on exclusive services. For example, reserved data blocks are described as null in Example 2, and any information bitmap may be filled in the reserved data blocks. Because these reserved data blocks do not have an explicit definition of an idle or non-idle code block, corresponding bits in a map are meaningless. The second communications device does not rely on reserved data blocks whose corresponding bits are described as null, but relies on pre-configuration information used by the device for slot allocation. The pre-configuration information may be configured by a network management device, obtained through negotiation between the first communications device and the second communications device, or sent by the first communications device to the second communications device (for example, transmitted in a FlexE overhead multiframe). Using n=12 and M=11 as an example, a sequence of corresponding data blocks that can be used to transmit candidate services may be determined with reference to FIG. 23. Then, the data blocks are divided into 12 equal parts in a manner similar to that in Example 6, and then allocated to specific candidate services. Among 11 candidate services, 10 candidate services each occupy ¹⁄₁₂ of the data blocks, and one candidate service occupies ²⁄₁₂ of the data blocks. In this case, bandwidths may be fairly obtained for the candidate services based on weights.

Different from Example 6, in Example 7, when there are no other types (for example, a null type) of data blocks but only a preset type of target data blocks in the 40 consecutive data blocks, for example, a set including a second group of data blocks shown in FIG. 23. In this case, it is actually not expected that a hybrid multiplexing overhead block is introduced into a data block reserved for a candidate service, but it is expected that the reserved data block is used to transmit the candidate service.

Figure 24:
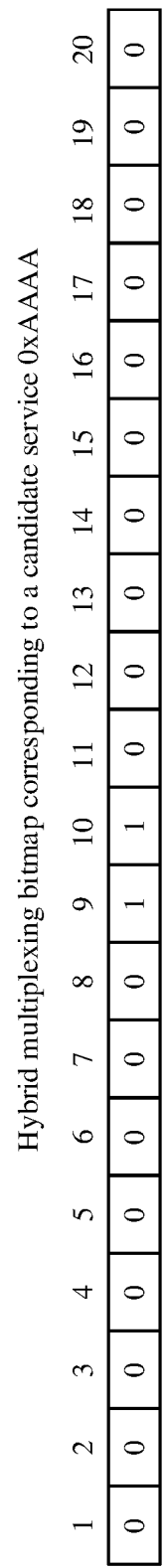
FIG. 24 is a schematic diagram of a hybrid multiplexing bitmap according to an embodiment of this application.

When there are no other types (for example, a null type) of data blocks but only a preset type of target data blocks in the first data block section, during demultiplexing, the second communications device determines whether the current first data block section includes a hybrid multiplexing overhead block; and if the current first data block section includes a hybrid multiplexing overhead block, performs demultiplexing according to an indication of the hybrid multiplexing overhead block; or if the current first data block section does not include a hybrid multiplexing overhead block, performs demultiplexing based on a hybrid multiplexing bitmap corresponding to an assured bandwidth. The hybrid multiplexing bitmap corresponding to the assured bandwidth is shown in FIG. 24. The hybrid multiplexing bitmap corresponding to the assured bandwidth may be preconfigured, or may be generated by the second communications device based on configuration information.

Example 8

Based on Example 6, after statistics about the target data blocks that are in the first data block section and that can be used to transmit the candidate services are collected, the target data blocks may alternatively not be grouped into data block sets, but the target data blocks are successively replaced with data blocks of candidate services that have been sorted according to a specific manner. For example, M=5, and a sequence of five candidate services is candidate services 1, 2, 3, 4, and 5. The target data blocks are successively replaced with data blocks of the candidate services 1 to 5 circularly.

Optionally, the candidate services may be sorted according to ID sizes, priorities, data volumes, and the like.

The foregoing embodiments are all described by using an example in which N is 20, that is, 20 slots each with a granularity of 5G are obtained through division based on a 100G Ethernet physical interface. Actually, this application may also be applied to hybrid multiplexing on exclusive services and candidate services in slots each with another granularity, for example, a granularity of 1G, 2G, 4G, or 10G.

Example 9

Figure 25:
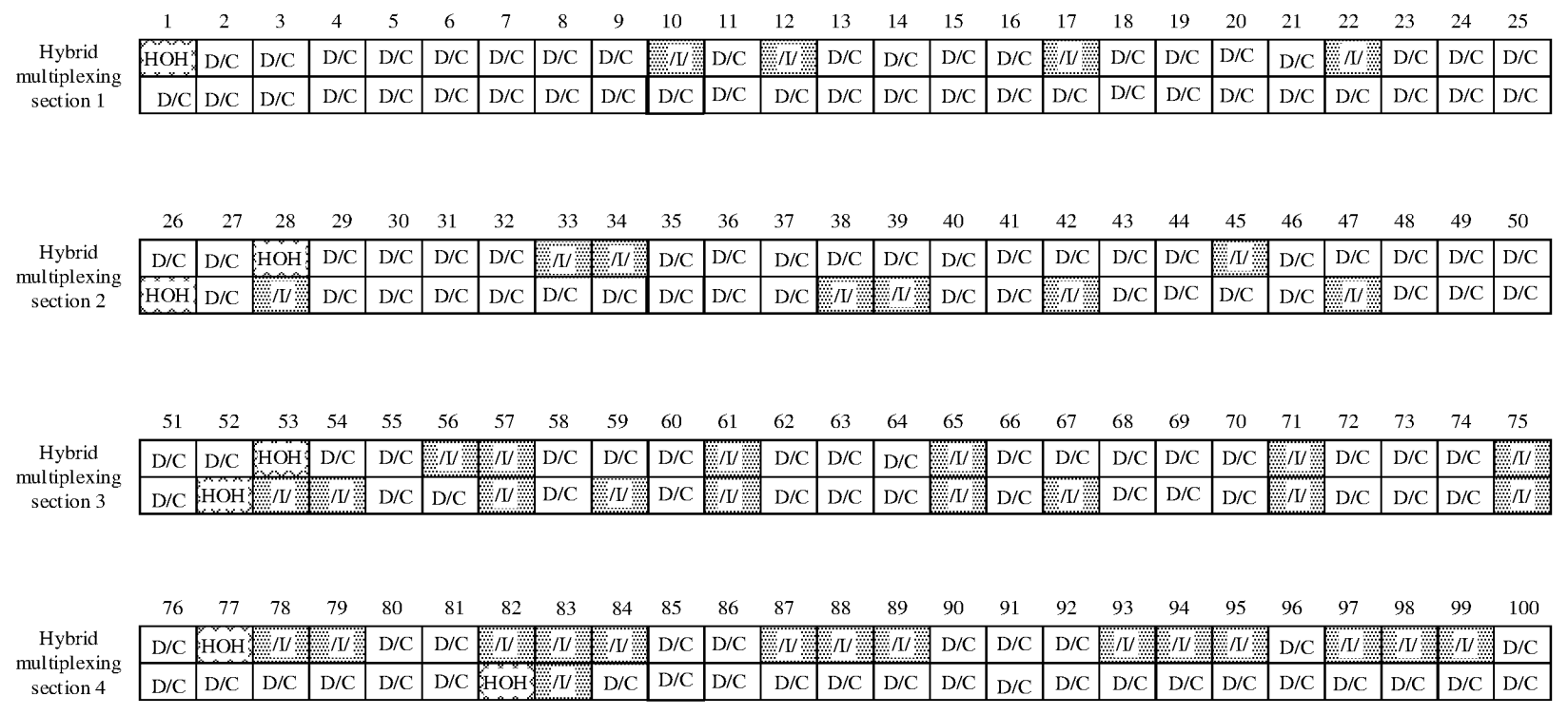
Figure 26:
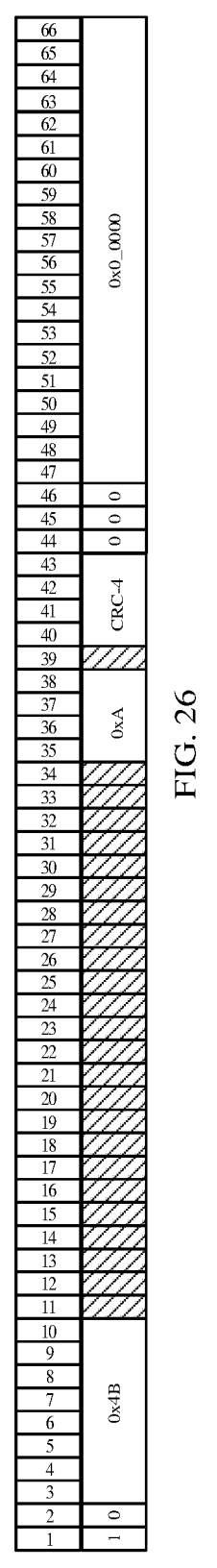

As shown in FIG. 25, an example in which 100 slots each with a granularity of 1G are obtained through division based on a 100G Ethernet physical interface is used. A quantity of data blocks included in a first data block section (that is, a hybrid multiplexing section) may be N=25. In this case, the 100 slots may be allocated to four first data block sections for hybrid multiplexing. Further, a map is represented by using 25 bits. A format of a hybrid multiplexing overhead block is shown in FIG. 26.

330. After obtaining the second data block section, the first communications device sends the second data block section to the second communications device, and the second communications device receives the second data block section.

340. The second communications device extracts the data blocks of the M candidate services from the second data block section, and restores the second data block section to the first data block section.

Correspondingly, the second communications device may extract the data blocks of the M candidate services from the second data block section based on a multiplexing relationship and first information, or a preset rule and first information. The multiplexing relationship, the preset rule, and the first information are described above.

Specifically, after receiving the second data block section, the second communications device identifies a hybrid multiplexing overhead block, extracts a map from the hybrid multiplexing overhead block, and performs demultiplexing based on the map and the preset rule to restore a second data stream to which the candidate services belong, and further restores the first data block section including the target data blocks of the exclusive services for subsequent demultiplexing to restore the exclusive services.

A processing process performed by the receive end device is described with reference to Example 1.

After receiving the second data block section, the second communications device identifies a hybrid multiplexing overhead block, and extracts a map from the hybrid multiplexing overhead block. The hybrid multiplexing overhead block is of a specific code block type and/or an O code type. Specifically, for example, a code block type of the hybrid multiplexing overhead block is 0x4B+0xA. As shown in FIG. 27, the second communications device performs search to identify a data block whose code block type is 0x4B+0xA, and extracts a map from the data block.

Figure 28:
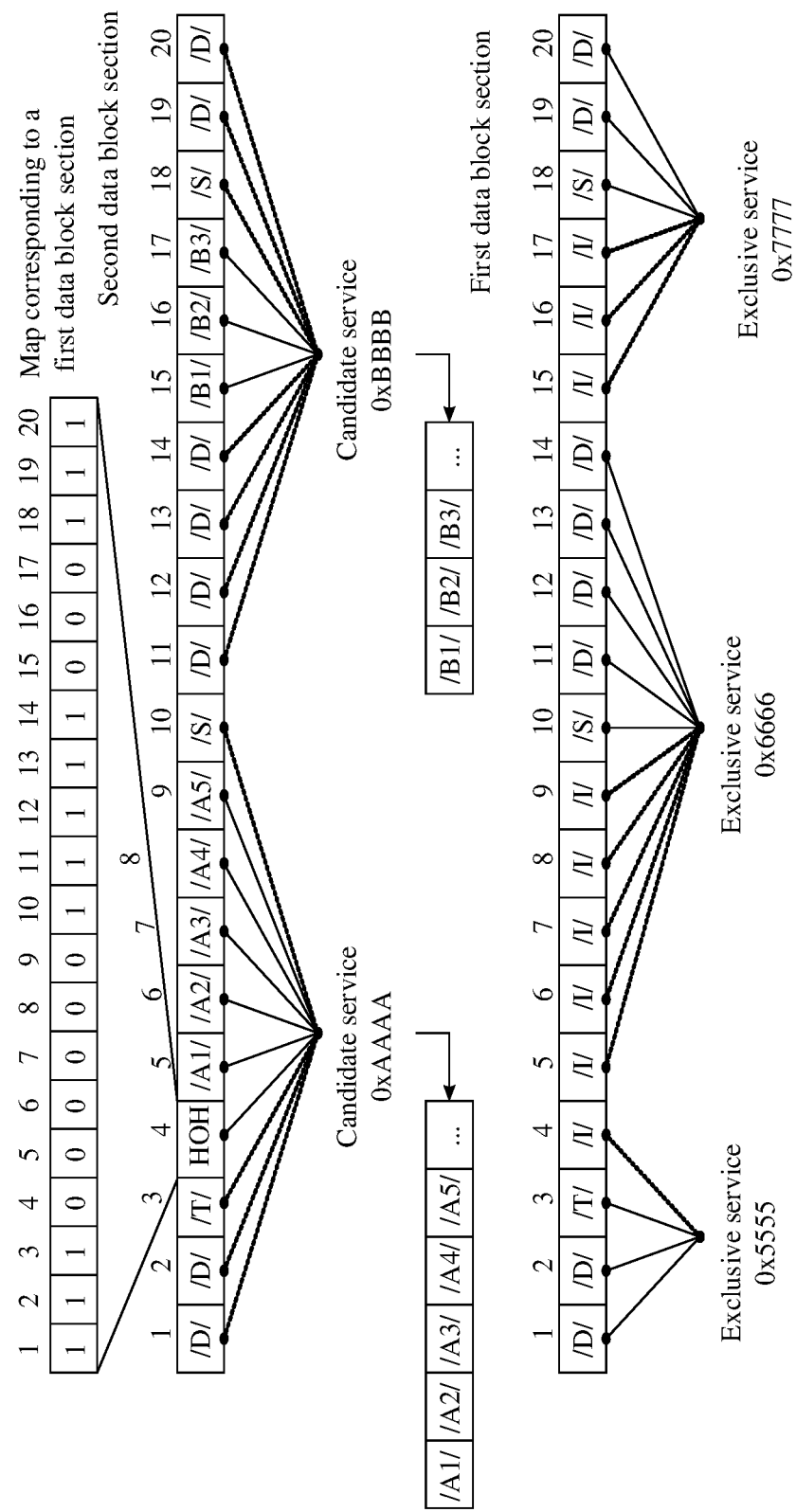
FIG. 28 shows an example of extracting data blocks of candidate services according to an embodiment of this application.

In this case, the second communications device may extract data blocks of the candidate services from the second data block section based on the received map and the multiplexing relationship or the preset sequence, and restore the first data block section. Specifically, as shown in FIG. 28, the second communications device determines, based on the preset rule, slots or data blocks occupied by the candidate services, extracts, based on a map, data blocks A1 to A5 of the candidate service 0xAAAA and data blocks B1 to B3 of the candidate service 0xBBBB, and restores data blocks whose identifier is "0" to a null type or a preset type of data blocks to restore an original data stream obtained after TDM multiplexing is performed on the exclusive services, that is, the first data block section. Further, the second communications device performs TDM demultiplexing on the first data block section. After performing TDM demultiplexing, the second communications device may obtain the exclusive services.

Similarly, slots each with a granularity other than 1G and 5G may alternatively be obtained through division based on the 100G Ethernet physical interface, and a quantity of data blocks included in the first data block section may be adjusted accordingly. For example, 80 slots each with a granularity of 1.25G may alternatively be obtained through division based on the 100G Ethernet physical interface, and the quantity of data blocks included in the first data block section may be N=40. In this case, the 80 slots may be allocated to two first data block sections for hybrid multiplexing.

A processing process performed by the receive end device is described with reference to Example 2.

Figure 29:
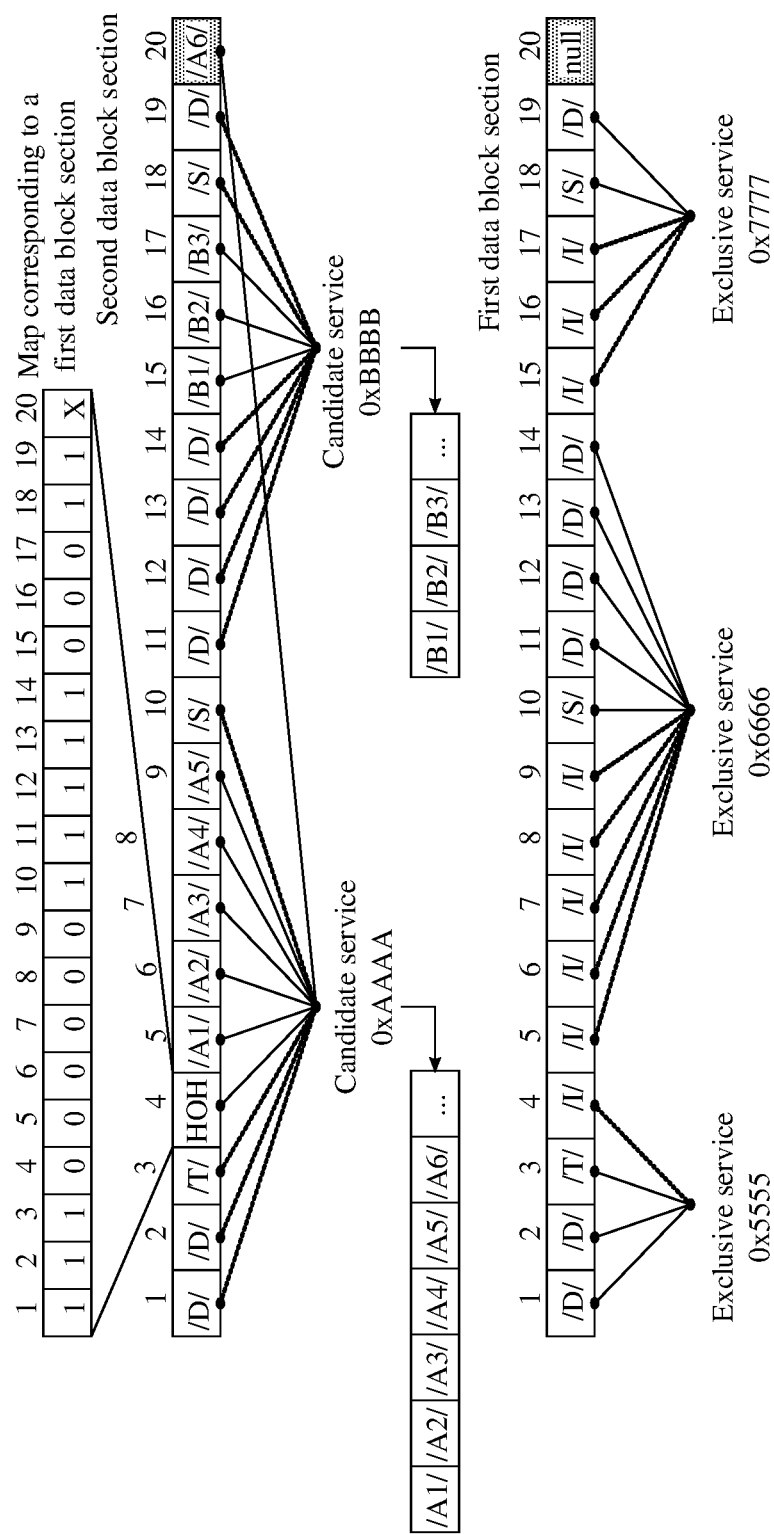
FIG. 29 shows another example of extracting data blocks of candidate services according to an embodiment of this application.

As shown in FIG. 29, the processing process is similar to that performed by the receive end device in Example 1. It should be noted that, when there are no other types (for example, a null type) of data blocks but only a preset type of target data blocks in the first data block section, during demultiplexing, the second communications device determines whether the current first data block section includes a hybrid multiplexing overhead block; and if the current first data block section includes a hybrid multiplexing overhead block, performs demultiplexing according to an indication of the hybrid multiplexing overhead block; or if the current first data block section does not include a hybrid multiplexing overhead block, performs demultiplexing based on a hybrid multiplexing bitmap corresponding to an assured bandwidth. The hybrid multiplexing bitmap corresponding to the assured bandwidth is shown in FIG. 24.

For processing processes performed at the receive end device in Examples 3 to 5, refer to Examples 1 and 2.

In the processing processes performed at the receive end device in Examples 6 to 8, the second communications device extracts data blocks of the candidate services based on an extraction sequence corresponding to a replacement sequence. For the extraction sequence, refer to the related description of the replacement sequence in Examples 6 to 8.

The foregoing embodiments are described by using an example in which M is greater than or equal to 2. It can be understood that the solutions in the embodiments of this application may also be applied to hybrid multiplexing on one candidate service.

The following describes apparatus embodiments in this application with reference to FIG. 30A and FIG. 30B to FIG. 34. It should be understood that, an apparatus for transmitting service data corresponds to the method for transmitting service data. For similar descriptions, refer to the method embodiment. It should be noted that, the apparatus for transmitting service data may be used in cooperation with the foregoing method for transmitting service data, or may be used independently.

Figure 30A:
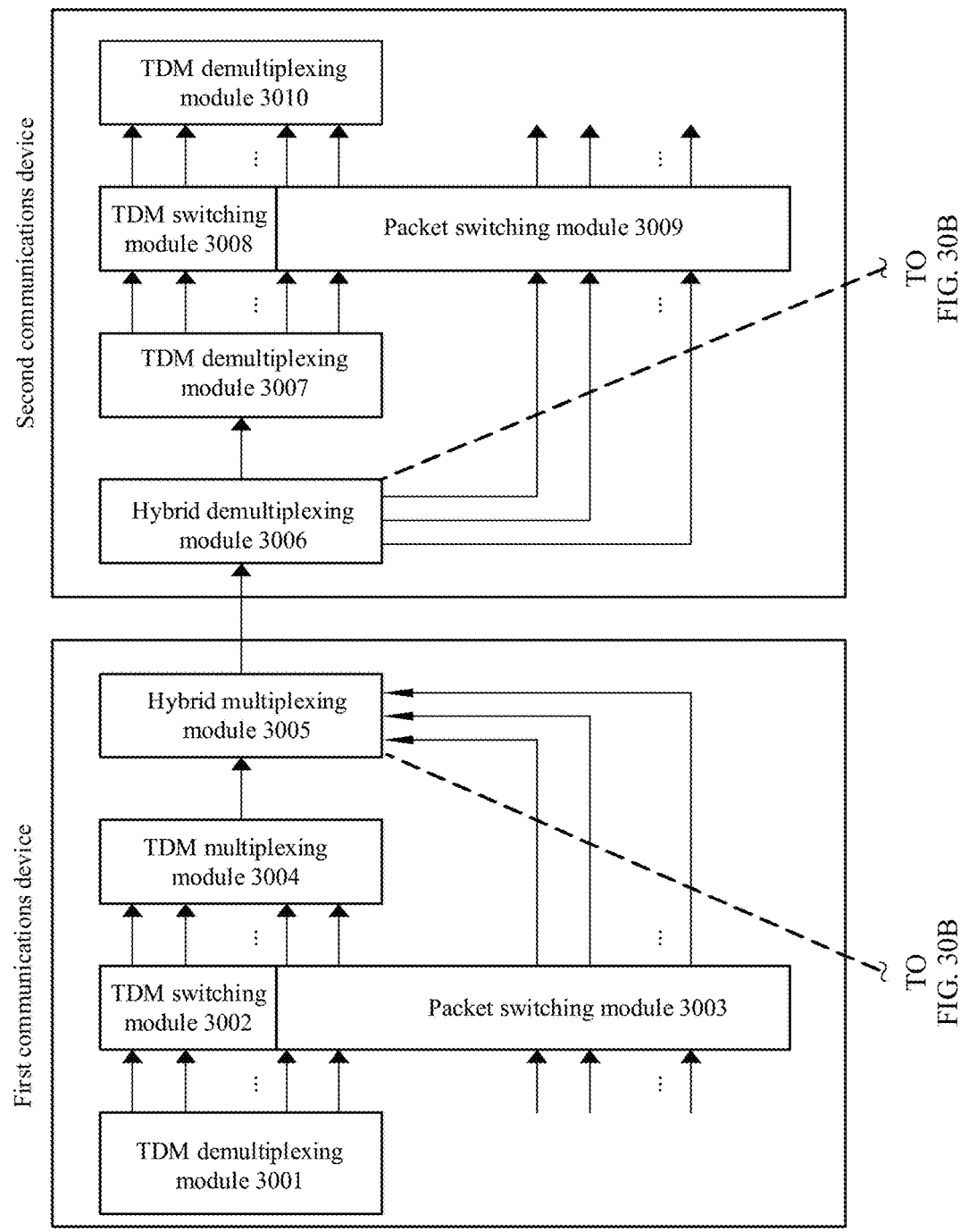
FIG. 30A and FIG. 30B are a schematic diagram of a structure of a system according to an embodiment of this application.
Figure 30B:
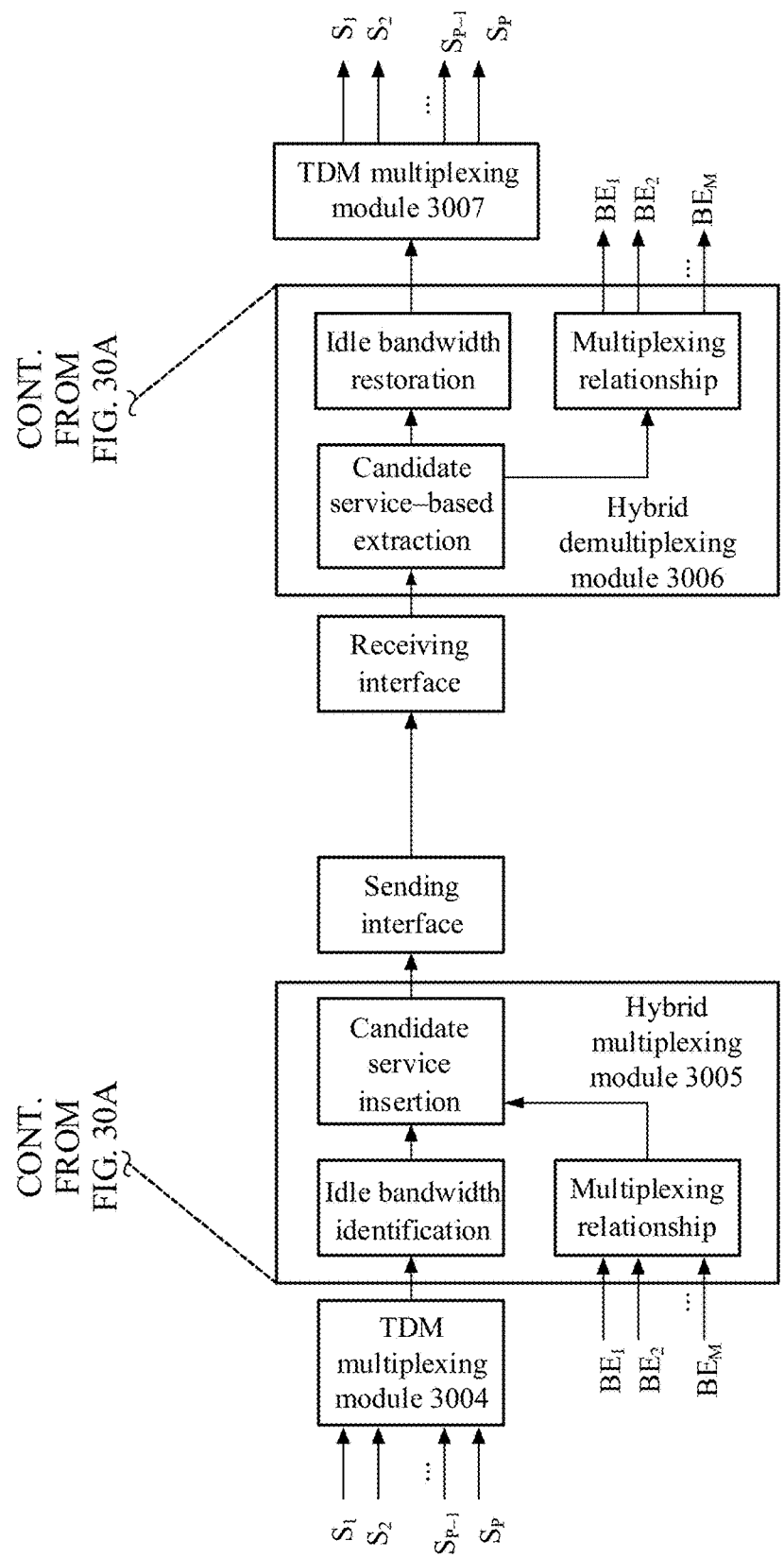

FIG. 30A and FIG. 30B are a schematic diagram of a structure of a system according to an embodiment of this application. A first communications device may correspond to the first communications device described above, and a second communications device may correspond to the second communications device described above. In this embodiment, a hybrid multiplexing module 3005 and a hybrid demultiplexing module 3006 are mainly used. Other modules may be implemented in an existing manner.

The first communications device includes a TDM demultiplexing module 3001, a TDM switching module 3002, a packet switching module 3003, a TDM multiplexing module 3004, and a hybrid multiplexing module 3005.

The TDM multiplexing module 3004 is configured to perform time division multiplexing on exclusive services S1 to SP to obtain a first data stream, and transmit the first data stream to the hybrid multiplexing module 3005.

The hybrid multiplexing module 3005 is configured to: identify target data blocks, that is, idle bandwidths, in N consecutive data blocks; and create a map corresponding to the N consecutive data blocks.

The hybrid multiplexing module 3005 is further configured to: multiplex M candidate services BE1 to BEM onto the idle bandwidths based on a multiplexing relationship and the map, and transmit an obtained second data block section to a sending interface, so that the second data block section is sent to the second communications device through the sending interface.

The second communications device includes a hybrid demultiplexing module 3006, a TDM demultiplexing module 3007, a TDM switching module 3008, a packet switching module 3009, and a TDM demultiplexing module 3010.

The hybrid demultiplexing module 3006 is configured to determine the N consecutive data blocks and the map corresponding to the N consecutive data blocks from a receiving interface.

The hybrid demultiplexing module 3006 is further configured to demultiplex and restore the candidate services BE1 to BEM and the exclusive services S1 to SP based on the map and the multiplexing relationship.

In this embodiment, the hybrid multiplexing module 3005 and the hybrid demultiplexing module 3006 are mainly used. Other modules may be implemented in an existing manner.

For specific functions and beneficial effects of the hybrid multiplexing module 3005 and the hybrid demultiplexing module 3006, refer to the method shown in FIG. 3.

Figure 31:
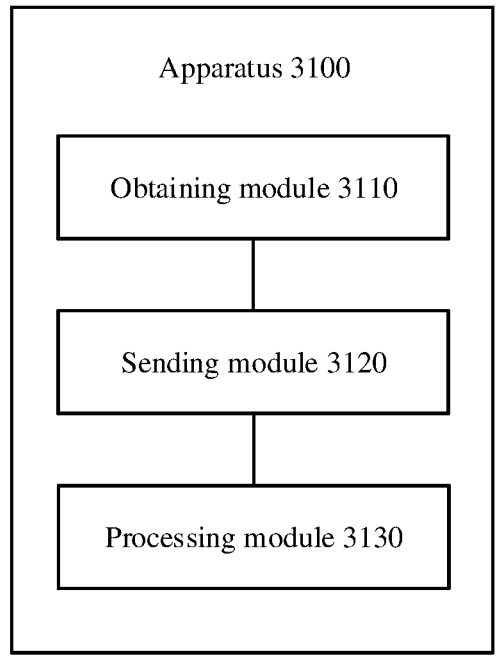
FIG. 31 is a schematic diagram of a structure of an apparatus, that is, a terminal device, for transmitting service data according to an embodiment of this application.

FIG. 31 is a schematic diagram of a structure of an apparatus for transmitting service data according to an embodiment of this application. As shown in FIG. 31, the apparatus 3100 includes an obtaining module 3110, a sending module 3120, and a processing module 3130.

The obtaining module 3110 is configured to obtain a to-be-sent first data block section.

The processing module 3130 is configured to replace target data blocks in the first data block section with data blocks of M first services to obtain a second data block section, where each of the target data blocks is a preset type of data block, and M is an integer greater than 1.

The sending module 3120 is configured to send the second data block section.

Optionally, the processing module 3130 is further configured to replace the target data blocks in the first data block section with the data blocks of the M first services based on a multiplexing relationship and first information, where the multiplexing relationship is a correspondence between the M first services and locations of data blocks in the first data block section, and the first information is used to indicate locations of the target data blocks in the first data block section.

Optionally, the processing module 3130 is further configured to replace the target data blocks in the first data block section with the data blocks of the M first services in a preset sequence based on first information, where the preset sequence is an arrangement sequence of the M first services during replacement of the target data blocks with the data blocks of the M first services, and the first information is used to indicate locations of the target data blocks in the first data block section.

Optionally, the preset sequence is a polling sequence, and the sending module 3120 is further configured to send second information, where the second information is used to indicate a location, in the first data block section, of the first target data block used to carry the 1st first service in the M first services.

Optionally, the polling sequence is a weighted polling sequence.

Optionally, the sending module 3120 is further configured to send third information, where the third information is used to indicate the multiplexing relationship.

Optionally, the sending module 3120 is further configured to send the third information by using overhead data blocks in a data stream to which the first data block section belongs.

Optionally, the overhead data blocks include a first part and a second part, the first part is used to transmit IDs of the M first services, the second part is used to transmit multiplexing service pointers, and the multiplexing service pointers are used to indicate first services corresponding to data blocks in the first data block section.

Optionally, the first data block section includes 20 data blocks, and the overhead data blocks include 32 overhead data blocks transmitted in one overhead multiframe. The 1st to 20th data blocks in the 32 overhead data blocks are used to transmit slot configuration information of one or more second services, the 21st and 22nd data blocks are used to transmit the IDs of the M first services, the 23rd to 32nd data blocks are used to transmit 20 multiplexing service pointers, and the first service is different from the second service; or the 1st to 20th data blocks in the 32 overhead data blocks are used to transmit slot configuration information of one or more second services, the 21st to 25th data blocks are used to transmit the IDs of the M first services, the 26th to 32nd data blocks are used to transmit 20 multiplexing service pointers, and the first service is different from the second service; or the 1st to 20th data blocks in the 32 overhead data blocks are used to transmit slot configuration information of one or more second services, the 21st to 27th data blocks are used to transmit the IDs of the M first services, the 28th to 32nd data blocks are used to transmit 20 multiplexing service pointers, and the first service is different from the second service; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, and an ID of a first service transmitted in the 20th data block is the same as an ID of a first service transmitted in the 21st or 22nd data block; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, an ID of a first service transmitted in the 20th data block is different from an ID of a first service transmitted in the 21st or 22nd data block, and a value range of the multiplexing service pointers includes 0-22.

Optionally, the sending module 3120 is further configured to send at least one piece of the first information.

Optionally, the second data block section includes at least one piece of the first information.

Optionally, the first information occupies one target data block, and the processing module 3130 is further configured to detect the target data blocks in the first data block section, and generate the first information; and determine the target data block occupied by the first information.

Optionally, the processing module 3130 is further configured to determine, based on sequence numbers of the target data blocks, the target data block occupied by the first information; or determine, based on a quantity of times the first information is transmitted in a slot corresponding to each of the target data blocks, the target data block occupied by the first information; or determine, based on a quantity of times a target data block appears in a slot corresponding to each of the target data blocks, the target data block occupied by the first information.

Optionally, the preset type includes a null type and/or a reserved type, and the reserved type indicates that the data block is a data block reserved for the M first services.

Optionally, one target data block corresponds to one slot, and the slot corresponds to a 1 Gbps bandwidth or a 5 Gbps bandwidth.

The obtaining module 3110 may be implemented by a transceiver or a processor. The sending module 3120 may be implemented by a transceiver. The processing module 3130 may be implemented by a processor. For specific functions and beneficial effects of the obtaining module 3110, the sending module 3120, and the processing module 3130, refer to the method shown in FIG. 3.

Figure 32:
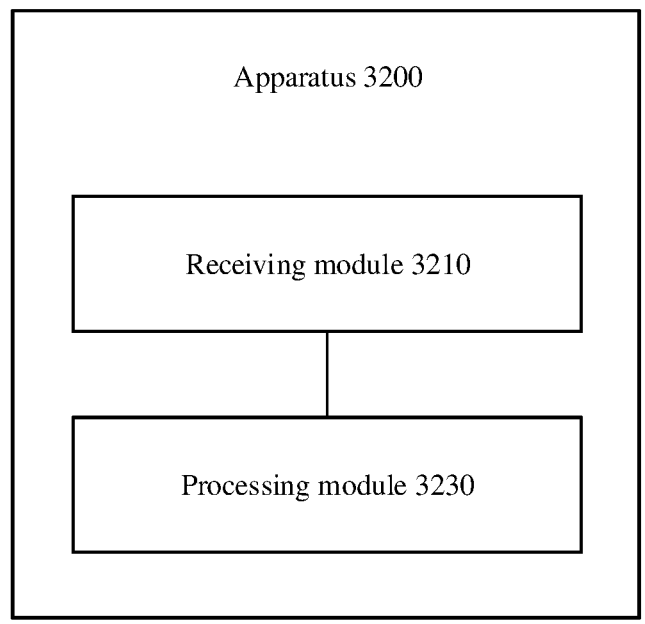
FIG. 32 is a schematic diagram of a structure of an apparatus, that is, a terminal device, for transmitting service data according to an embodiment of this application.

FIG. 32 is a schematic diagram of a structure of an apparatus, that is, a terminal device, for transmitting service data according to an embodiment of this application. As shown in FIG. 32, the apparatus 3200 includes a receiving module 3210 and a processing module 3230.

The receiving module 3210 is configured to receive a second data block section, where the second data block section is obtained by replacing target data blocks in a first data block section with data blocks of M first services, each of the target data blocks is a preset type of data block, and M is an integer greater than 1.

The processing module 3230 is configured to extract the data blocks of the M first services from the second data block section, and restore the second data block section into the first data block section.

Optionally, the processing module 3230 is further configured to extract the data blocks of the M first services from the second data block section based on a multiplexing relationship and first information, where the multiplexing relationship is a correspondence between the M first services and locations of data blocks in the first data block section, and the first information is used to indicate locations of the target data blocks in the first data block section.

Optionally, the processing module 3230 is further configured to extract the data blocks of the M first services from the second data block section in a preset sequence based on first information, where the preset sequence is an arrangement sequence of the M first services during replacement of the target data blocks with the data blocks of the M first services, and the first information is used to indicate locations of the target data blocks in the first data block section.

Optionally, the preset sequence is a polling sequence, and the receiving module 3210 is further configured to receive second information, where the second information is used to indicate a location, in the first data block section, of the first target data block used to carry the 1st first service in the M first services.

Optionally, the polling sequence is a weighted polling sequence.

Optionally, the receiving module 3210 is further configured to receive third information, where the third information is used to indicate the multiplexing relationship.

Optionally, the third information is carried in overhead data blocks in a data stream to which the first data block section belongs.

Optionally, the overhead data blocks include a first part and a second part, the first part is used to transmit IDs of the M first services, the second part is used to transmit multiplexing service pointers, and the multiplexing service pointers are used to indicate first services corresponding to data blocks in the first data block section.

Optionally, the first data block section includes 20 data blocks, and the overhead data blocks include 32 overhead data blocks transmitted in one overhead multiframe. The 1st to 20th data blocks in the 32 overhead data blocks are used to transmit slot configuration information of one or more second services, the 21st and 22nd data blocks are used to transmit the IDs of the M first services, the 23rd to 32nd data blocks are used to transmit 20 multiplexing service pointers, and the first service is different from the second service; or the 1st to 20th data blocks in the 32 overhead data blocks are used to transmit slot configuration information of one or more second services, the 21st to 25th data blocks are used to transmit the IDs of the M first services, the 26th to 32nd data blocks are used to transmit 20 multiplexing service pointers, and the first service is different from the second service; or the 1st to 20th data blocks in the 32 overhead data blocks are used to transmit slot configuration information of one or more second services, the 21st to 27th data blocks are used to transmit the IDs of the M first services, the 28th to 32nd data blocks are used to transmit 20 multiplexing service pointers, and the first service is different from the second service; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, and an ID of a first service transmitted in the 20th data block is the same as an ID of a first service transmitted in the 21st or 22nd data block; or the 1st to 19th data blocks in the 32 overhead data blocks are used to transmit slot configuration information of one or more second services, the 20th to 22nd data blocks are used to transmit the IDs of the M first services, the 23rd to 32nd data blocks are used to transmit 20 multiplexing service pointers, an ID of a first service transmitted in the 20th data block is different from an ID of a first service transmitted in the 21st or 22nd data block, and a value range of the multiplexing service pointers includes 0-22.

Optionally, the receiving module 3210 is further configured to receive at least one piece of the first information.

Optionally, the second data block section includes at least one piece of the first information.

Optionally, the preset type includes a null type and/or a reserved type, and the reserved type indicates that the data block is a data block reserved for the M first services.

Optionally, one target data block corresponds to one slot, and the slot corresponds to a 1 Gbps bandwidth or a 5 Gbps bandwidth.

The receiving module 3210 may be implemented by a transceiver. The processing module 3230 may be implemented by a processor. For specific functions and beneficial effects of the receiving module 3210 and the processing module 3230, refer to the method shown in FIG. 3.

Figure 33:
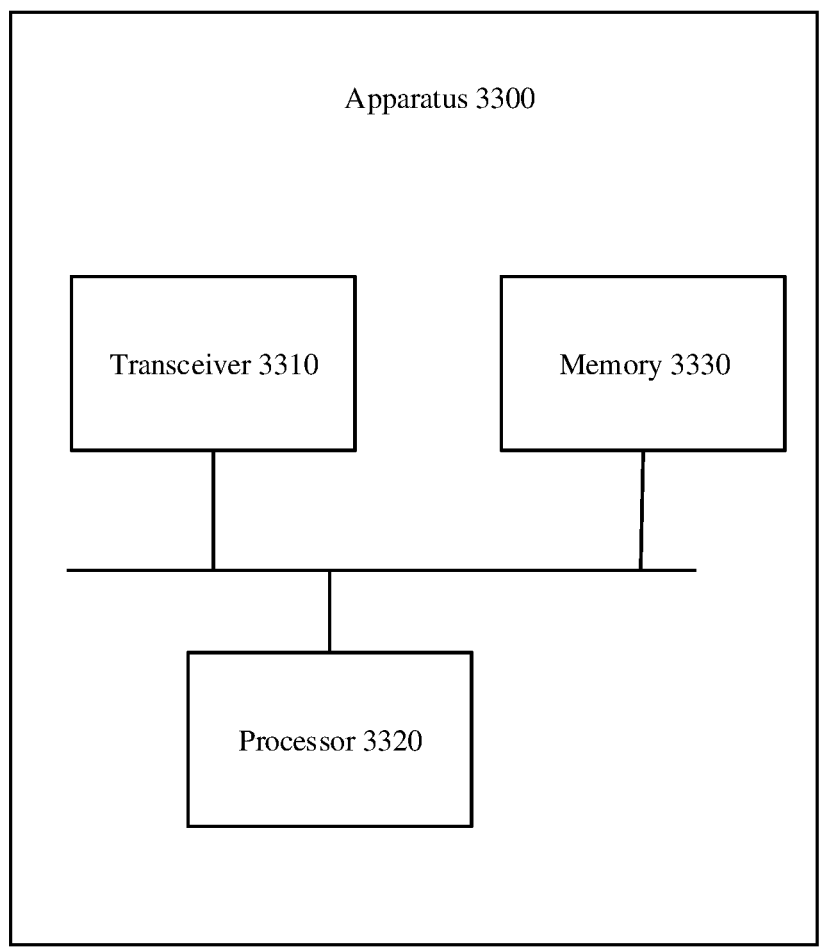
FIG. 33 is a schematic diagram of a structure of an apparatus for transmitting service data according to another embodiment of this application.

FIG. 33 is a schematic diagram of a structure of an apparatus for transmitting service data according to another embodiment of this application. As shown in FIG. 33, the apparatus 3300 may include a transceiver 3310, a processor 3320, and a memory 3330.

Only one memory and one processor are shown in FIG. 33. In an actual communications device product, there may be one or more processors and one or more memories. The memory may also be referred to as a storage medium, a storage device, or the like. The memory may be disposed independently of the processor, or may be integrated with the processor. This is not limited in the embodiments of this application.

The transceiver 3310, the processor 3320, and the memory 3330 communicate with each other through an internal connection path to transfer a control signal and/or a data signal.

Specifically, the processor 3320 is configured to obtain a to-be-sent first data block section. Alternatively, the transceiver 3310 is configured to obtain a to-be-sent first data block section.

The processor 3320 is configured to replace target data blocks in the first data block section with data blocks of M first services to obtain a second data block section, where each of the target data blocks is a preset type of data block, and M is an integer greater than 1.

The transceiver 3310 is configured to send the second data block section.

For a specific working process and beneficial effects of the apparatus 3300, refer to the description in the embodiment shown in FIG. 3.

Figure 34:
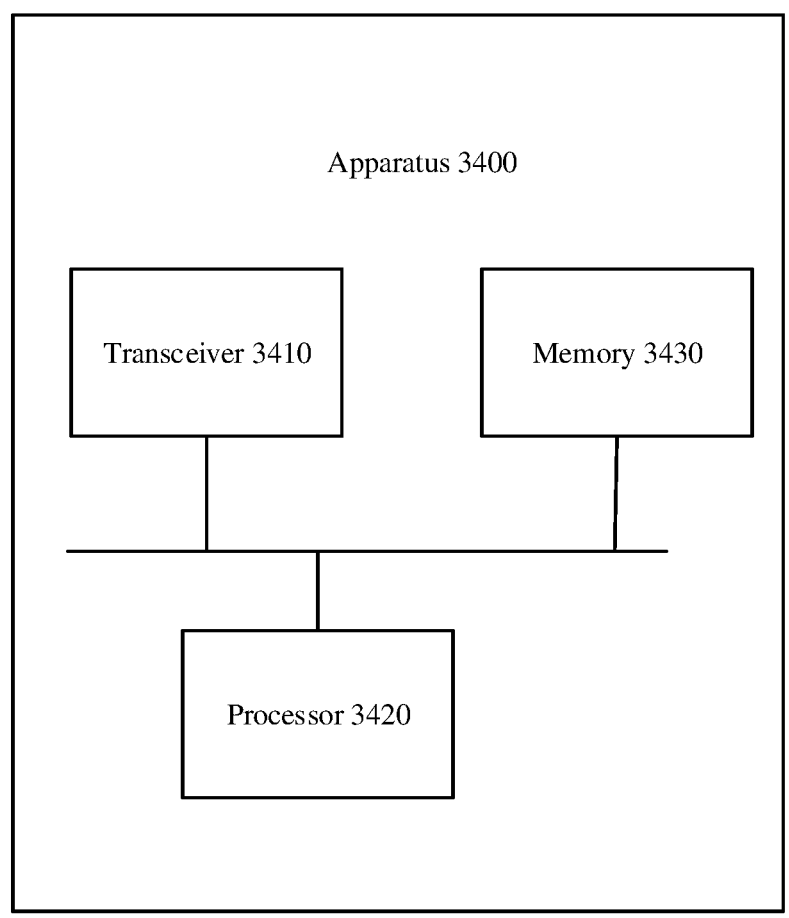
FIG. 34 is a schematic diagram of a structure of an apparatus for transmitting service data according to another embodiment of this application.

FIG. 34 is a schematic diagram of a structure of an apparatus for transmitting service data according to another embodiment of this application. As shown in FIG. 34, the apparatus 3400 may include a transceiver 3410, a processor 3420, and a memory 3430.

Only one memory and one processor are shown in FIG. 34. In an actual communications device product, there may be one or more processors and one or more memories. The memory may also be referred to as a storage medium, a storage device, or the like. The memory may be disposed independently of the processor, or may be integrated with the processor. This is not limited in the embodiments of this application.

The transceiver 3410, the processor 3420, and the memory 3430 communicate with each other through an internal connection path to transfer a control signal and/or a data signal.

Specifically, the transceiver 3410 is configured to receive a second data block section, where the second data block section is obtained by replacing target data blocks in a first data block section with data blocks of M first services, each of the target data blocks is a preset type of data block, and M is an integer greater than 1.

The processor 3420 is configured to extract the data blocks of the M first services from the second data block section, and restore the second data block section to the first data block section.

For a specific working process and beneficial effects of the apparatus 3400, refer to the description in the embodiment shown in FIG. 3.

The transceiver in the embodiments of this application may also be referred to as a transceiver unit, a transceiver, a transceiver apparatus, or the like. The processor may also be referred to as a processing unit, a processing board, a processing module, a processing apparatus, or the like. Optionally, a component that is configured to implement a receiving function in the transceiver may be considered as a receiving unit, and a component that is configured to implement a sending function in the transceiver may be considered as a sending unit. In other words, the transceiver includes the receiving unit and the sending unit. The receiving unit may also be sometimes referred to as a receiver, a receiver, a receiving circuit, or the like. The sending unit may also be referred to as a transmitter machine, a transmitter, a transmitting circuit, or the like.

The memory described in the embodiments of this application is configured to store one or more computer instructions and one or more parameters required by the processor for running.

The processor in the embodiments of this application may be an integrated circuit chip, and is capable of signal processing. In an implementation process, steps in the foregoing methods can be completed by using a hardware integrated logical circuit in the processor, or by using instructions in a form of software. The foregoing processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads instructions in the memory and completes the steps in the foregoing methods in combination with hardware of the processor.

It should be understood that, the terms "system" and "network" in this application are usually used interchangeably in this specification. The term "and/or" in this application describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects.

Sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

People of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the described system, apparatus, and unit, refer to corresponding processes in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods according to the embodiments of this application. The foregoing storage medium includes any medium, for example, a USB flash drive, a removable hard disk, a read-only memory (ROM), a random access memory (RAM), a magnetic disk, or an optical disc, that can store program code.

The foregoing descriptions are merely non-limiting examples of implementations and are not intended to limit the protection scope, which is intended to cover any variation or replacement readily determined by a person of ordinary skill in the art. Therefore, the claims shall define the protection scope.

What is claimed is:

1. A method for transmitting service data, comprising:
obtaining a to-be-sent first data block section;
replacing target data blocks in the first data block section with data blocks of M first services to obtain a second data block section, wherein each of the target data blocks is a preset type of data block, and M is an integer greater than 1; and
sending the second data block section,
wherein the replacing target data blocks in the first data block section with data blocks of M first services comprises:
replacing the target data blocks in the first data block section with the data blocks of the M first services based on a multiplexing relationship and first information, wherein the multiplexing relationship is a correspondence between the M first services and locations of data blocks in the first data block section, and the first information indicates locations of the target data blocks in the first data block section.

2. The method according to claim 1, further comprising:
sending third information by using overhead data blocks in a data stream to which the first data block section belongs, wherein the third information indicates the multiplexing relationship.

3. The method according to claim 2 wherein the overhead data blocks comprise a first part and a second part, IDs of the M first services are transmitted by using the first part, multiplexing service pointers are transmitted by using the second part, and the multiplexing service pointers indicate first services corresponding to data blocks in the first data block section.

4. The method according to claim 1, further comprising:
sending at least one piece of the first information by using the second data block section.

5. The method according to claim 4, wherein the first information occupies one target data block, and the method further comprises:
- detecting the target data blocks in the first data block section, and generating the first information; and
- determining a target data block occupied by the first information.

6. The method according to claim 5, wherein the determining the target data block occupied by the first information comprises:
- determining, based on sequence numbers of the target data blocks, the target data block occupied by the first information; or
- determining, based on a quantity of times the first information is transmitted in a slot corresponding to each of the target data blocks, the target data block occupied by the first information; or
- determining, based on a quantity of times a target data block appears in a slot corresponding to each of the target data blocks, the target data block occupied by the first information.

7. The method according to claim 1, wherein the preset type of data block comprises a null type and/or a reserved type, and the reserved type indicates that the data block is a data block reserved for the M first services.

8. A method for transmitting service data, comprising:
- receiving a second data block section, wherein the second data block section is obtained by replacing target data blocks in a first data block section with data blocks of M first services, each of the target data blocks is a preset type of data block, and M is an integer greater than 1; and
- extracting the data blocks of the M first services from the second data block section, and restoring the second data block section to the first data block section,
- wherein the extracting the data blocks of the M first services from the second data block section comprises:
- extracting the data blocks of the M first services from the second data block section based on a multiplexing relationship and first information, wherein the multiplexing relationship is a correspondence between the M first services and locations of data blocks in the first data block section, and the first information indicates locations of the target data blocks in the first data block section.

9. An apparatus for transmitting service data, comprising:
- one or more processors; and
- a non-transitory computer-readable memory storing a program to be executed by the one or more processors, the program including instructions that, when executed by the one or more processors, cause the apparatus to:
- obtain a to-be-sent first data block section;
- replace target data blocks in the first data block section with data blocks of M first services to obtain a second data block section, wherein each of the target data blocks is a preset type of data block, and M is an integer greater than 1; and
- send the second data block section,
- where in the program further comprises instructions that cause the apparatus to:
- replace the target data blocks in the first data block section with the data blocks of the M first services based on a multiplexing relationship and first information, wherein the multiplexing relationship is a correspondence between the M first services and locations of data blocks in the first data block section, and the first information indicates locations of the target data blocks in the first data block section.

10. The apparatus according to claim 9, wherein the program further comprises instructions that cause the apparatus to:
- send third information by using overhead data blocks in a data stream to which the first data block section belongs, wherein the third information indicates the multiplexing relationship.

11. The apparatus according to claim 10, wherein the overhead data blocks comprise a first part and a second part, IDs of the M first services are transmitted by using the first part, multiplexing service pointers are transmitted by using the second part, and the multiplexing service pointers indicate first services corresponding to data blocks in the first data block section.

* * * * *